US009742535B2

(12) United States Patent
Lorca Hernando

(10) Patent No.: US 9,742,535 B2
(45) Date of Patent: Aug. 22, 2017

(54) METHOD AND A SYSTEM FOR PERFORMING VIRTUALIZATION OF A RADIO ACCESS TECHNOLOGY OVER ORTHOGONAL FREQUENCY-DIVISION MULTIPLE ACCESS (OFDMA) WIRELESS NETWORKS AND COMPUTER PROGRAM PRODUCTS THEREOF

(71) Applicant: Telefonica, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 207 days.

(21) Appl. No.: 14/579,304

(22) Filed: Dec. 22, 2014

(65) Prior Publication Data

US 2015/0180629 A1 Jun. 25, 2015

(30) Foreign Application Priority Data

Dec. 23, 2013 (EP) .................................... 13382549

(51) Int. Cl.
*H04L 5/00* (2006.01)
*H04L 25/03* (2006.01)
*H04J 11/00* (2006.01)

(52) U.S. Cl.
CPC ............ *H04L 5/0048* (2013.01); *H04J 11/00* (2013.01); *H04L 5/0005* (2013.01);
(Continued)

(58) Field of Classification Search
None
See application file for complete search history.

(56) References Cited

U.S. PATENT DOCUMENTS 7,952,989 B2 * 5/2011 Qi .......................... H04L 5/0007
370/208
8,009,552 B2 * 8/2011 Branlund ............ H04W 74/002
370/208
(Continued)

FOREIGN PATENT DOCUMENTS

EP    2 288 064 A1    2/2011
WO   2009/153809 A2  12/2009
(Continued)

OTHER PUBLICATIONS

European Search Report for EP 13 38 2549, dated Mar. 11, 2014.

*Primary Examiner* — Alpus H Hsu
(74) *Attorney, Agent, or Firm* — Sughrue Mion, PLLC

(57) ABSTRACT

A method for performing virtualization of a radio access technology (RAT) over Orthogonal Frequency-Division Multiple Access (OFDMA) wireless networks is provided. The method includes splitting OFDMA time-frequency resources into non-overlapping regions including a virtualization region including a part of a spectrum and the OFDMA symbols that are reserved for virtualization of the RAT; reserving resource elements of the OFDMA time-frequency resources in the virtualization region, for insertion of downlink reference signals including complex sequences known by a receiver to perform downlink channel estimation with a specified separation between signals in time and frequency domains; inserting training or pilot signals along the OFDMA time-frequency resources of the virtualization region; and mapping complex baseband symbols corresponding to information from the RAT into the OFDMA time-frequency resources of the virtualization region.

18 Claims, 20 Drawing Sheets

(52) U.S. Cl.
CPC ...... *H04L 5/0007* (2013.01); *H04L 25/03006* (2013.01); *H04L 25/03866* (2013.01)

(56) References Cited

U.S. PATENT DOCUMENTS

| | | | | |
|---|---|---|---|---|
| 8,125,885 B2* | 2/2012 | Bertrand | ............ | H04L 27/2657 370/203 |
| 8,149,782 B2* | 4/2012 | Noh | ............ | H04L 5/0007 370/330 |
| 8,270,435 B2* | 9/2012 | Olszewski | ............ | H04L 5/0007 370/208 |
| 8,351,413 B2* | 1/2013 | Lee | ............ | H04L 5/0007 370/344 |
| 8,547,822 B2* | 10/2013 | Branlund | ............ | H04W 74/002 370/208 |
| 8,630,212 B2* | 1/2014 | Moon | ............ | H04L 27/2626 370/281 |
| 8,724,492 B2* | 5/2014 | Frank | ............ | H04L 5/0035 370/252 |
| 8,737,326 B2* | 5/2014 | Boariu | ............ | H04W 72/042 370/329 |
| 8,817,726 B2* | 8/2014 | Seo | ............ | H04L 12/40026 370/329 |
| 8,817,769 B2* | 8/2014 | Palanki | ............ | H04W 52/16 370/329 |
| 8,942,081 B2* | 1/2015 | Kang | ............ | H04W 72/042 370/208 |
| 9,184,886 B2* | 11/2015 | Bontu | ............ | H04L 5/001 |
| 9,265,017 B2* | 2/2016 | Sorrentino | ............ | H04W 52/325 |
| 9,398,122 B2* | 7/2016 | Choi | ............ | H04L 5/001 |
| 2005/0094613 A1 | 5/2005 | Cho et al. | | |
| 2007/0098050 A1 | 5/2007 | Khandekar et al. | | |
| 2011/0090854 A1* | 4/2011 | Montojo | ............ | H04L 5/0007 370/329 |
| 2011/0268070 A1* | 11/2011 | Guan | ............ | H04L 5/0007 370/329 |
| 2013/0107859 A1* | 5/2013 | Shi | ............ | H04W 36/18 370/331 |
| 2013/0242780 A1* | 9/2013 | Dayal | ............ | H04W 24/00 370/252 |
| 2013/0308481 A1* | 11/2013 | Kazmi | ............ | H04W 24/02 370/252 |
| 2013/0329686 A1* | 12/2013 | Kim | ............ | H04W 72/04 370/329 |
| 2014/0022961 A1* | 1/2014 | Park | ............ | H04W 52/146 370/280 |
| 2016/0028518 A1* | 1/2016 | Zhao | ............ | H04L 1/0028 370/330 |

FOREIGN PATENT DOCUMENTS

| | | |
|---|---|---|
| WO | 2011/047355 A2 | 4/2011 |
| WO | 2011/146766 A1 | 11/2011 |

* cited by examiner

METHOD AND A SYSTEM FOR PERFORMING VIRTUALIZATION OF A RADIO ACCESS TECHNOLOGY OVER ORTHOGONAL FREQUENCY-DIVISION MULTIPLE ACCESS (OFDMA) WIRELESS NETWORKS AND COMPUTER PROGRAM PRODUCTS THEREOF

FIELD OF THE ART

The present invention generally relates to the field of radio virtualization. Particularly, present invention relates to a method, a system and computer program products for performing virtualization of a radio access technology (RAT) over Orthogonal Frequency-Division Multiple Access (OFDMA) wireless networks.

BACKGROUND OF THE INVENTION

Orthogonal Frequency-Division Multiple Access (OFDMA) is a multiple access technique where access is shared among the different users in the frequency domain, by subdividing the system bandwidth into a number of subcarriers enjoying orthogonal access. Resources can also be assigned in the time domain on a per-user basis. The available subcarriers can thus be scheduled to different users and signals in a very flexible way, by employing both frequency and time domains. A number of communication systems employ OFDMA for both wireless and wired (fixed) networks, such as Long-Term Evolution (LTE) or Asymmetric Digital Subscriber Line (ADSL), among others.

Long-Term Evolution (LTE) is the next step in cellular Third-Generation (3G) systems, which represents basically an evolution of present mobile communications standards, such as Universal Mobile Telecommunication System (UMTS) and Global System for Mobile Communications (GSM) [1]. It is a Third Generation Partnership Project (3GPP) standard that provides throughputs up to 50 Mbps in uplink and up to 100 Mbps in downlink. It uses scalable bandwidth from 1.4 to 20 MHz in order to suit the needs of network operators that have different bandwidth allocations, employing OFDMA as multiple access technique. LTE is also expected to improve spectral efficiency in networks, allowing carriers to provide more data and voice services over a given bandwidth.

LTE-Advanced (LTE-A), an evolution of LTE, is being standardized in LTE Release 10 and beyond. It is aimed at fulfilling International Mobile Telecommunications (IMT)-Advanced requirements, whose capabilities go beyond those of IMT-2000 and include enhanced peak data rates to support advanced services and applications (100 Mbps for high mobility, and 1 Gbps for low mobility).

One of the growing fields of interest in LTE is so-called Radio Access Network (RAN) virtualization, whereby improved RAN architectures are being explored for higher flexibility of operation. Examples of RAN virtualization are so-called Cloud-RAN (where baseband processing of multiple cells is centralized and radio access is provided through a set of remote radio heads), and network-in-a-cell (the opposite case, where the whole radio access and core network are integrated in one site). All these examples can leverage on generic hardware for processing purposes and different software modules for the different network nodes.

All the above solutions share the property of keeping the fundamental properties of the original radio access technology unchanged prior to virtualization, such as carrier frequency, access technique, physical layer or frequency of operation.

At the same time, there exist situations where two or more RATs must coexist for deploying basic services. This happens in LTE, where data-only services are available and legacy circuit-switched (CS) connections must be served through appropriate redirection/handover to a different RAT (so-called Circuit Switched Fallback, or CSFB) [2]. In these cases redirection to a legacy RAT implies losing the previous LTE connection as a different frequency band is involved, unless terminals are equipped with dual radio frequency front-ends.

RAT coexistence is sometimes approached through exploiting gaps in the transmission of a given RAT (e.g. blank subframes in LTE), where no physical signal is present, and filling them with transmissions of a second RAT (e.g. WiMAX) that fit the timing of the first RAT as disclosed in U.S. Pat. No. 8,547,989 "Methods and Systems for LTE-WiMAX Coexistence". Such an approach avoids interference between RATs when they use the same frequencies or frequencies so close to each other that significant interference would appear.

Terminals capable of transmitting and receiving simultaneously in two RATs are rarely seen in cellular networks due to increased cost and power consumption. Instead, multi-RAT terminals are often limited to transmit and receive using only one RAT at a time, therefore precluding simultaneous operation of multiple RATs. Simultaneous operation in low-power unlicensed bands is usually allowed (e.g. WiFi and Bluetooth) but not in licensed bands reserved for cellular use where a given quality of service must be guaranteed.

If not implementing dual radios, terminals must switch between RATs when necessary. As an example, CSFB from LTE to a 3G/2G RAT poses significant issues in order to take care of an incoming/outgoing voice call. As the two RATs involve different frequencies, the user terminal must spend a significant time searching for the other RAT in order to acquire system information prior to connecting to the other cell. Furthermore, the switching from one frequency band to the other must be done in a very short period of time. After completion of the voice call the user must also reselect to any LTE cell as soon as possible, and this mechanism is not always efficient and usually suffers from large return times to LTE.

The fragmentation of LTE spectrum has motivated the introduction of Carrier Aggregation capabilities in some real networks. This fact, together with the necessary support of other RATs and frequency bands, complicates the RF structure of the terminals as a high number of transceivers must be integrated into a single device. Re-farming of legacy spectrum for LTE purposes undergoes a slow and difficult process, and in the meantime devices must cope with a high number of frequency bands which must be prioritized due to space and power consumption restrictions.

On the other hand, coexistence of LTE and other data-capable RATs (such as UMTS/HSPA) is not usually exploited in a coordinated way. As an example, it is difficult to exploit the differences in cell load for inter-RAT load balancing purposes, unless some proprietary interaction between the schedulers of both cells is implemented. Other solutions for seamless inter-RAT operation would therefore be desirable.

Some advanced techniques such as inter-RAT Carrier Aggregation (e.g. combining HSPA and LTE) will also require simultaneous operation in two or more RATs. In these cases the traditional solution comprises dual radio transceivers with the subsequent increase in cost, volume and power consumption.

Some hybrid solutions do exist for a combined Orthogonal Frequency Division Multiple Access (OFDMA) and Code Division Multiple Access (CDMA), such as the one described in U.S. Pat. No. 8,427,936 "Multiple-Access Hybrid OFDM-CDMA System", where CDMA multiple access is performed over the frequency domain of an OFDM system. These proposals only address the combined OFDM and CDMA operations for a hybrid multiple access system, but no attention is given to seamless coexistence and interoperation of several radio access technologies using the same radio frequency front-end.

The solution in U.S. Pat. No. 8,547,989 requires a switching time between RATs to avoid interference and thus precludes simultaneous operation of the two RATs. In addition, two separate radio transceivers are still required at the device because of the fundamentally different bandwidths, sampling frequencies, guard bands, or emission limits that characterize the signals in the two RATs. Devices would therefore need to incorporate two radio frequency front-ends with the same increase in cost, volume and power consumption than dual radio transceivers.

More efficient ways for dealing with multiple RATs in the same frequency band are therefore desirable in order to reduce the complexity of multi-RAT devices.

REFERENCES

[1] 3GPP TS 36.300, Evolved Universal Terrestrial Radio Access (E-UTRA) and Evolved Universal Terrestrial Radio Access Network (E-UTRAN); Overall Description, Stage 2 (Release 8)
[2] S. Sesia, I. Toufik, M. Baker (editors), "LTE, the UMTS Long Term Evolution: From Theory to Practice" (2nd edition), John Wiley & Sons, 2011
[3] H. Holma, A. Toskala (eds.), "WCDMA for UMTS: Radio Access for Third Generation Mobile Communications", $5^{th}$ edition, Wiley, p. 443

SUMMARY OF THE INVENTION

To address the above-discussed deficiencies of the prior art, the present invention in accordance with a first aspect provides a method for performing virtualization of a radio access technology, such a second-generation or a third-generation cellular wireless technology including at least GSM, UMTS/HSPA, WiMAX or CDMA2000, over Orthogonal Frequency-Division Multiple Access (OFDMA) wireless networks, wherein at least one user terminal is wirelessly connected to at least one base station both supporting the baseband processing required by said radio access technology in addition to the baseband processing required for operation in said OFDMA wireless network.

On contrary of the known proposals, the method of the first aspect comprises:
splitting OFDMA time-frequency resources in each subframe of the OFDMA frame structure,
in uplink operation, into two non-overlapping regions, one of said two non-overlapping regions comprising part of the spectrum and OFDMA symbols reserved for operation of said OFDMA wireless network, and a second region comprising the remaining part of said spectrum and OFDMA symbols reserved for virtualization of said radio access technology; and in downlink operation, into three non-overlapping regions, one of said three non-overlapping regions comprising part of the spectrum and a number of OFDMA symbols reserved for common control information of the OFDMA wireless network and said radio access technology, a second region comprising part of the spectrum and a number of OFDMA symbols not used for common control information reserved for data and control information of the OFDMA wireless network, and a third region comprising the remaining part of said spectrum and OFDMA symbols reserved for virtualization of said radio access technology;

reserving, in the downlink operation, resource elements in the split OFDMA time-frequency resources reserved for virtualization of said radio access technology, for insertion of downlink reference signals including complex sequences known by a receiver to perform downlink channel estimation by said user terminals with a specified separation between signals in the time and frequency domains;

inserting, in the uplink operation, training or pilot signals along the split OFDMA time-frequency resources reserved for virtualization of said radio access technology, by mapping said training or pilot signals over time-frequency resources scheduled for a particular user according to a multiple access scheme supported by said radio access technology, said mapping including reserving a number of time-frequency resources for said training or pilot signals with a specified separation between signals in the time and frequency domains; and mapping, in said downlink and uplink operation, complex baseband symbols corresponding to information from said radio access technology into said split OFDMA time-frequency resources reserved for virtualization of said radio access technology, wherein said mapping being performed:
by skipping, in uplink operation, in said split OFDMA time-frequency resources reserved for virtualization of said radio access technology, training or pilot signals dedicated to channel estimation in said radio access technology; and
by skipping, in downlink operation, OFDMA time-frequency resources reserved for insertion of downlink reference signals dedicated to channel estimation in said radio access technology.

In accordance with an embodiment in the downlink operation, previous to said mapping, a scrambling operation with a cell-specific scrambling code can be applied to said complex baseband symbols.

The mapping of the complex baseband symbols depending on the radio access technology can be performed by means of a time division multiple access scheme, a frequency division multiple access scheme, a code division multiple access scheme and/or a space division multiple access scheme. Preferably, said mapping of the complex baseband symbols into said split OFDMA time-frequency resources reserved for virtualization of said radio access technology is performed from lower to higher OFDMA symbols and from lower to higher subcarriers.

The downlink reference signals and the uplink training or pilot signals preferably have a separation in the time domain given by the minimum supported coherence time of the channel, and a separation in the frequency domain given by the minimum supported coherence bandwidth of the channel.

Furthermore, the split OFDMA time-frequency resources reserved for common control information of said OFDMA wireless network and said radio access technology are exploited by means of using synchronization and basic control mechanisms of said OFDMA wireless network and said radio access technology.

In an embodiment, the OFDMA wireless network is a Long Term Evolution (LTE) wireless network. Therefore, the time-frequency resources reserved for common control information of said OFDMA wireless network and said radio access technology include a Physical Downlink Control Channel (PDCCH), a Physical Control Format Indicator Channel (PCFICH), a Physical HARQ Indicator Channel (PHICH), a Cell Reference Signal (CRS), a Primary/Secondary Synchronization Signal (PSS/SSS) and a Physical Broadcast Channel (PBCH).

The part of the spectrum reserved for virtualizing said radio access technology as a preferred option is located at one of the edges of the LTE spectrum to preserve the single-carrier nature of LTE uplink operation.

In accordance with another embodiment, the mapped complex baseband symbols can be translated into RF signals to be transmitted in the downlink or in the uplink.

In accordance to a second aspect present invention provides a system for performing virtualization of a radio access technology, such a second-generation or a third-generation cellular wireless technology including at least GSM, UMTS/HSPA, WiMAX or CDMA2000, over Orthogonal Frequency-Division Multiple Access (OFDMA) wireless networks, e.g. an LTE wireless network, comprising at least one user terminal wirelessly connected to at least one base station both supporting the baseband processing required by said radio access technology in addition to the baseband processing required for operation in said OFDMA wireless network.

On contrary of the known proposals, the system of the second aspect further includes:

means for splitting OFDMA time-frequency resources in each subframe of the OFDMA frame structure, in uplink operation, into two non-overlapping regions, one of said two non-overlapping regions comprising part of the spectrum and OFDMA symbols reserved for operation of said OFDMA wireless network, and a second region comprising the remaining part of said spectrum and OFDMA symbols reserved for virtualization of said radio access technology; and in downlink operation, into three non-overlapping regions, one of said three non-overlapping regions comprising part of the spectrum and a number of OFDMA symbols reserved for common control information of said OFDMA wireless network and said radio access technology, a second region comprising part of the spectrum and a number of OFDMA symbols not used for common control information reserved for data and control information of said OFDMA wireless network, and a third region comprising the remaining part of said spectrum and OFDMA symbols reserved for virtualization of said radio access technology;

means for reserving, in the downlink operation, resource elements in the split OFDMA time-frequency resources reserved for virtualization of said radio access technology, for insertion of downlink reference signals including complex sequences known by a receiver to perform downlink channel estimation by said user terminals with a specified separation between signals in the time and frequency domains;

means for inserting, in the uplink operation, training or pilot signals along the split OFDMA time-frequency resources reserved for virtualization of said radio access technology, by mapping said training or pilot signals over time-frequency resources scheduled for a particular user according to a multiple access scheme supported by said radio access technology, said mapping including reserving a number of time-frequency resources for said training or pilot signals with a specified separation between signals in the time and frequency domains; and means for mapping, in said downlink and uplink operation, complex baseband symbols corresponding to information from said radio access technology into said split OFDMA time-frequency resources reserved for virtualization of said radio access technology, wherein said mapping being performed:

by skipping, in uplink operation, in said split OFDMA time-frequency resources reserved for virtualization of said radio access technology, training or pilot signals dedicated to channel estimation in said radio access technology; and by skipping, in downlink operation, OFDMA time-frequency resources reserved for insertion of downlink reference signals dedicated to channel estimation in said radio access technology.

The system may further include means for scrambling, in said downlink operation, previous to said mapping, complex baseband symbols with a cell-specific scrambling code and means for translating said mapped complex baseband symbols into RF signals to be transmitted in the downlink or in the uplink operation.

Preferably the downlink reference signals and the uplink training or pilot signals have a separation in the time domain given by the minimum supported coherence time of the channel, and a separation in the frequency domain given by the minimum supported coherence bandwidth of the channel.

The system of the second aspect is adapted to implement the method of the first aspect.

The subject matter described herein can be implemented in software in combination with hardware and/or firmware, or a suitable combination of them. For example, the subject matter described herein can be implemented in software executed by a processor.

According to another aspect there is provided a computer program product for virtualization of a radio access technology over OFDMA wireless networks comprising a computer-readable medium having instructions stored thereon, the instructions being executed by one or more processors and the instructions carrying out the method described herein.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF THE INVENTION

The present invention introduces the idea of RAT virtualization over OFDMA wireless networks, whereby a given RAT is virtualized within part of the spectrum assigned to the OFDMA network by embedding its physical layer structure into some of the OFDMA time-frequency resources. A "physical layer tunnel" is thus created that conveys the information of the virtualized RAT into suitable subcarriers and symbols of the total system bandwidth, with some proposed modifications aimed at adapting the OFDMA physical layer to the specifics of the virtualized RAT. The virtualized RAT will benefit from the properties of OFDMA physical layer (robustness to multipath, ease of detection, etc.) while keeping the baseband processing almost unchanged, thereby enabling the support of multi-RAT radio accesses with a single radio frequency (RF) head.

In what follows the term "original RAT" will refer to the radio access technology to be virtualized, and "virtualized RAT" will refer to the proposed scheme where the original RAT is conveyed by suitable OFDMA time-frequency resources. Many of the embodiments to be described will consider the particular case of an LTE wireless network for the sake of clarity, but this does not preclude the use of any other wireless network based on OFDMA.

Figure 1:
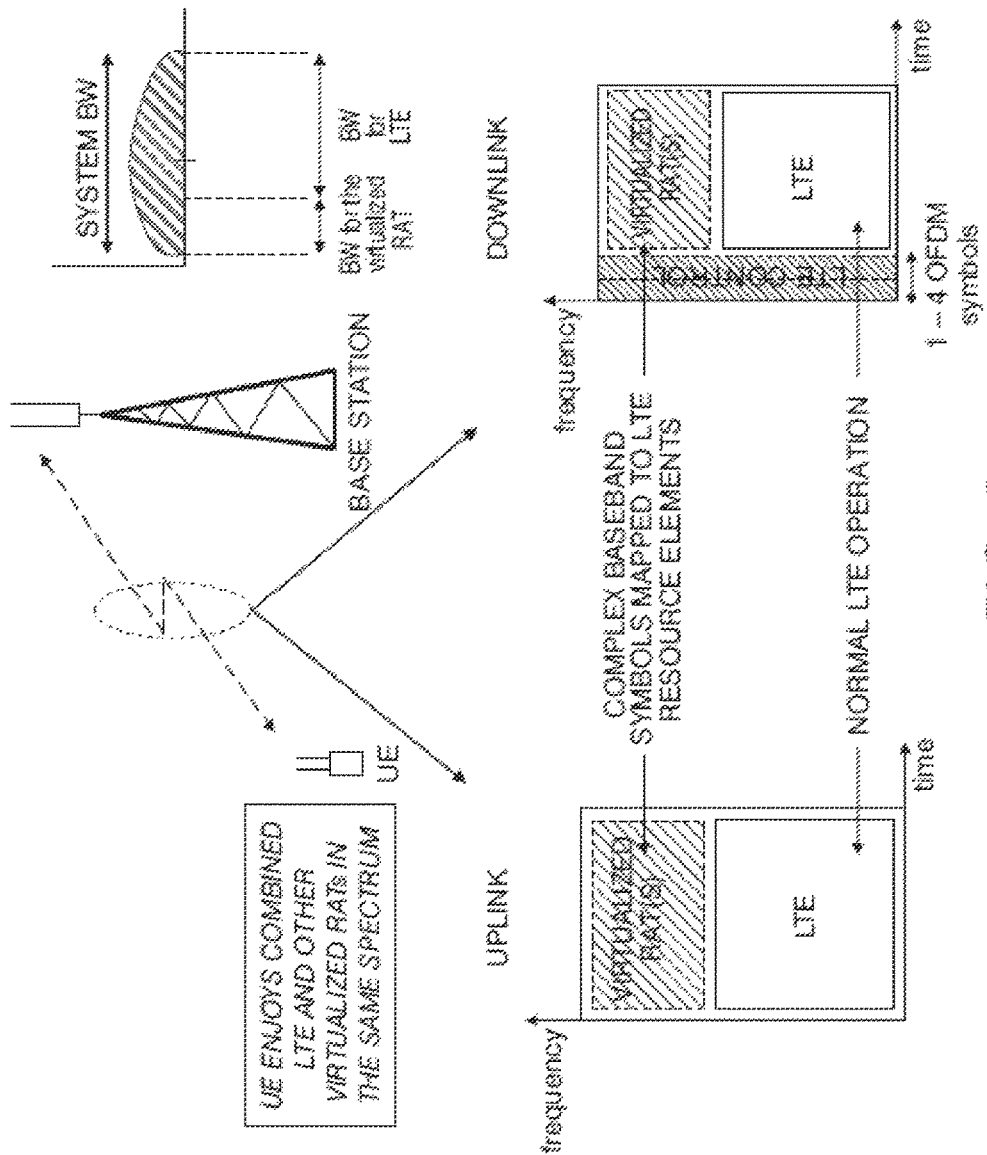
FIG. 1 illustrates the basic concept of RAT virtualization over LTE.

In reference to FIG. 1 it is illustrated the basic concept of the invention for a particular case of RAT virtualization over LTE wireless networks. A part of the LTE spectrum is semi-statically reserved for virtualization of a given RAT (such as GSM, UMTS/HSPA, WiMAX or CDMA2000). It is possible to dedicate part of the LTE resources as a way to transmit and receive information corresponding to the original RAT, by using any suitable mapping of the original complex symbols (in time, frequency, code and/or space domains) to the LTE symbols and subcarriers. Additional signals for channel estimation are also introduced for dealing with several possible multiple access strategies as employed by the original RAT.

Figure 2:
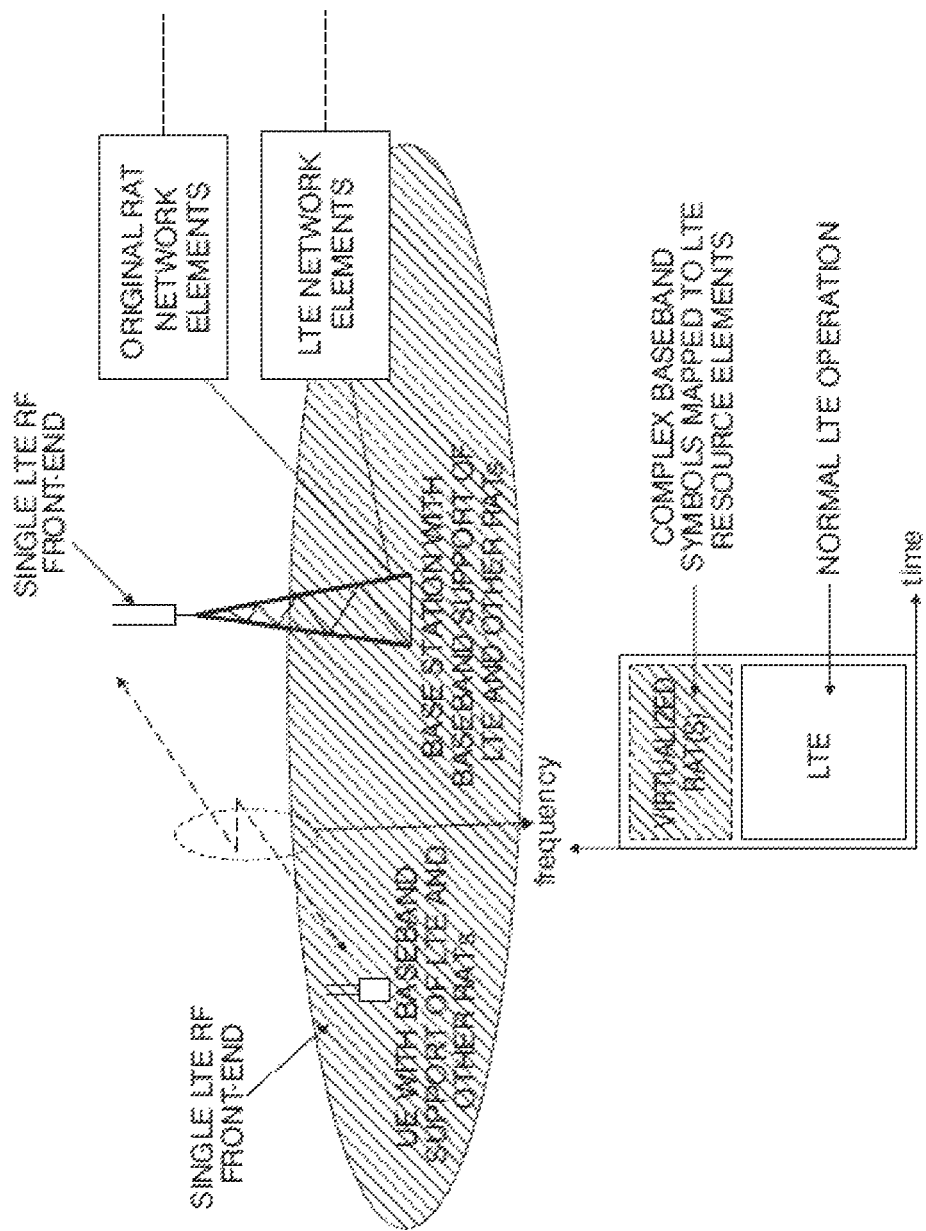
FIG. 2 illustrates a scenario where the invention can be implemented according to a particular case for LTE networks.

FIG. 2 illustrates the scenario for the proposed invention for the particular case of LTE networks. A device with baseband support of LTE and one or more additional RATs is wirelessly connected to a base station that also supports the required basebands. Such base station will have proper connections to the necessary network elements from both LTE and the additional RAT(s). Prior art techniques do not envisage any interoperation between RATs, which are individually exploited by using different RF front-ends and frequency bands. This invention proposes to virtualize one or several radio access technologies over part of the LTE spectrum and resources in order to enable combined services with a single RF chain at the device. Similar considerations can be done for other OFDMA networks not based on LTE.

The overall system bandwidth would be unchanged with respect to normal OFDMA operation. Therefore the receiver will benefit from the same detection algorithms as those foreseen in OFDMA, for demodulation of data from both OFDMA and the virtualized RAT.

The RAT(s) to be virtualized will be tunnelled over part of the OFDMA spectrum by exploiting the flexible time-frequency structure of the OFDMA physical layer, as well as enhanced space-division capabilities by means of Multiple Input Multiple Output (MIMO). Traditional limitations of non-OFDMA receivers (such as multipath resolution, maximum number of multipath components, time resolution and maximum delay spread, among others) can be overcome up to the limits of the cyclic prefix length. Perfect orthogonality in WCDMA-based RATs can also be ensured as no sequence misalignments will be present in the frequency domain.

Moreover, it would be feasible to perform inter-RAT carrier aggregation between OFDMA and the virtualized RAT. In this case one of the component carriers (or a part of it) could be devoted to the virtualized RAT(s) while the other could remain for OFDMA.

In what follows it will be assumed that only one virtualized RAT is conveyed by part of the OFDMA resources, however, those skilled in the art will easily generalize the concepts to any desired number of virtualized RATs without departure from the ideas proposed in this invention.

Figure 3:
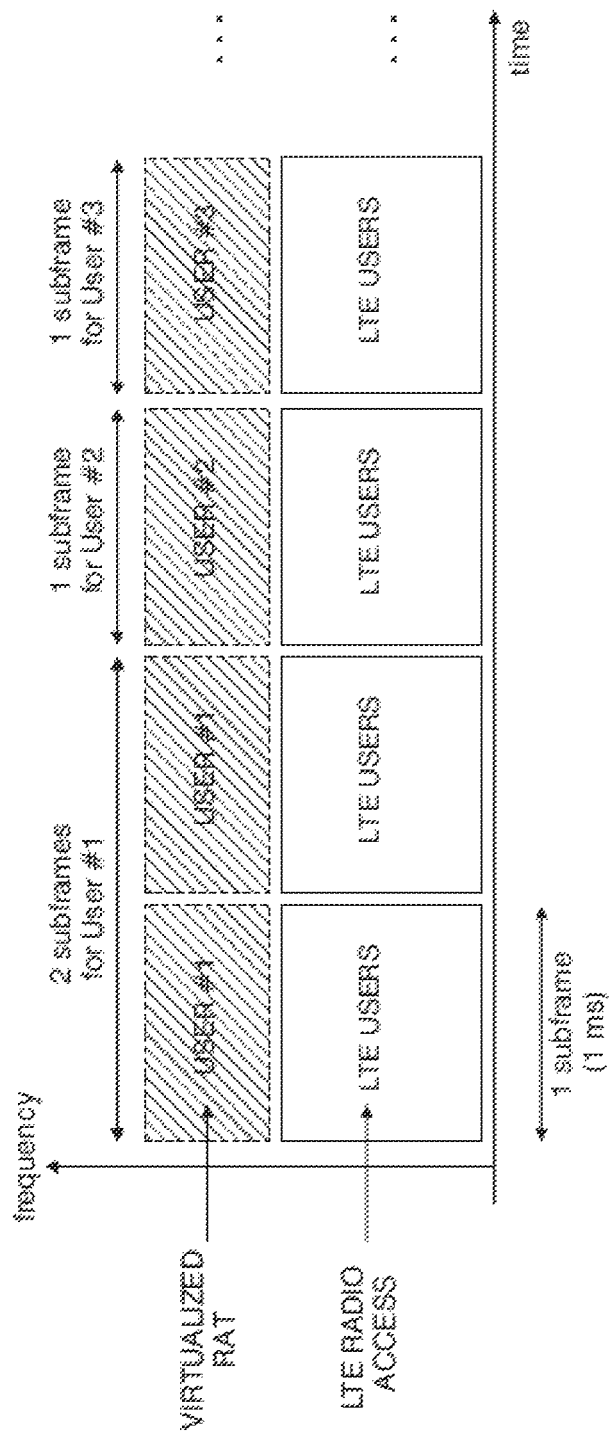
FIG. 3 is an example of a pure time-division multiple access for the virtualized RAT, employing LTE as OFDMA network.

In order the original RAT being virtualized, multiple access techniques depending on the multiple access schemes employed by the original RAT can be used, for instance:

Pure time-division multiple access: This case grants the whole bandwidth to each user over specific time occasions. The mapping operation should ensure that the whole bandwidth reserved for the virtualized RAT is granted to a user for a given duration which should be a multiple of one OFDMA subframe (1 ms in the case of LTE). FIG. 3 illustrates a case where the users are granted the whole bandwidth over a number of LTE subframes in both uplink and downlink (in FIG. 3, two subframes for user #1 and one subframe for users #2 and #3).

Figure 4:
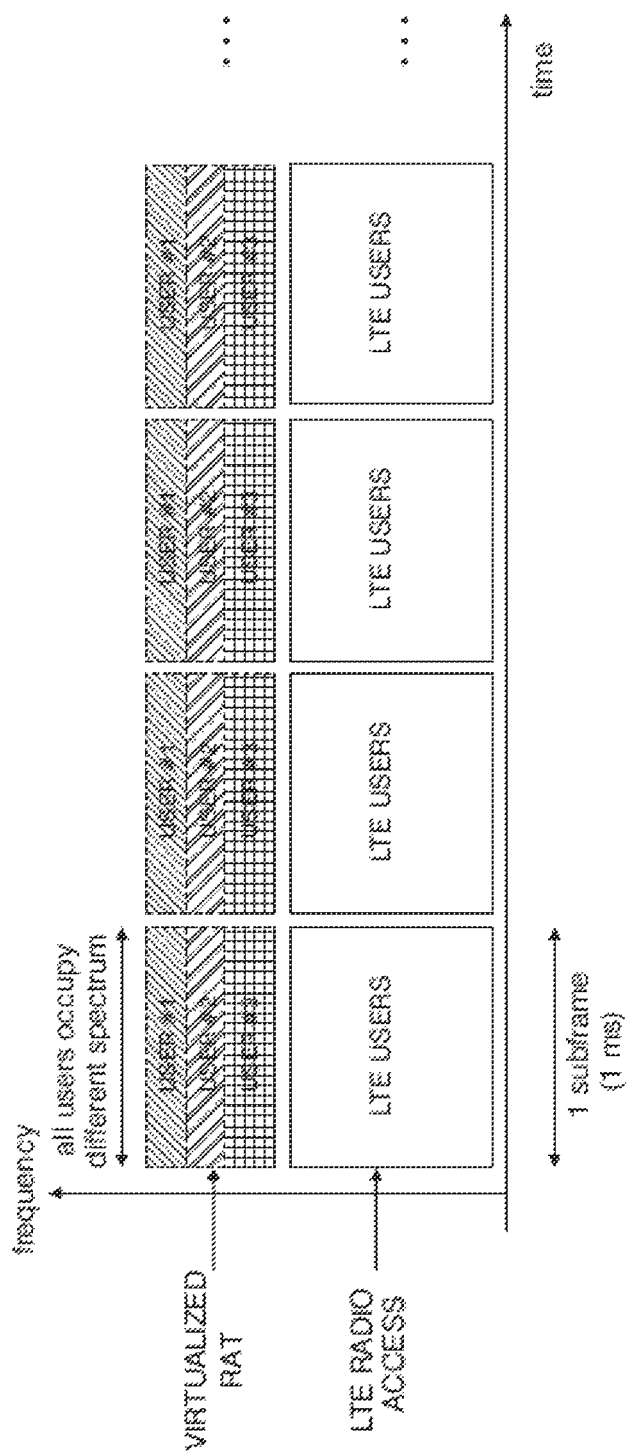
FIG. 4 is an example of a pure frequency-division multiple access for the virtualized RAT, employing LTE as OFDMA network.

Pure frequency-division multiple access: This case grants accesses according to a given partitioning of resources in the frequency domain. FIG. 4 illustrates such case where all downlink transmissions take place simultaneously by occupying different portions of the LTE spectrum.

Figure 5:
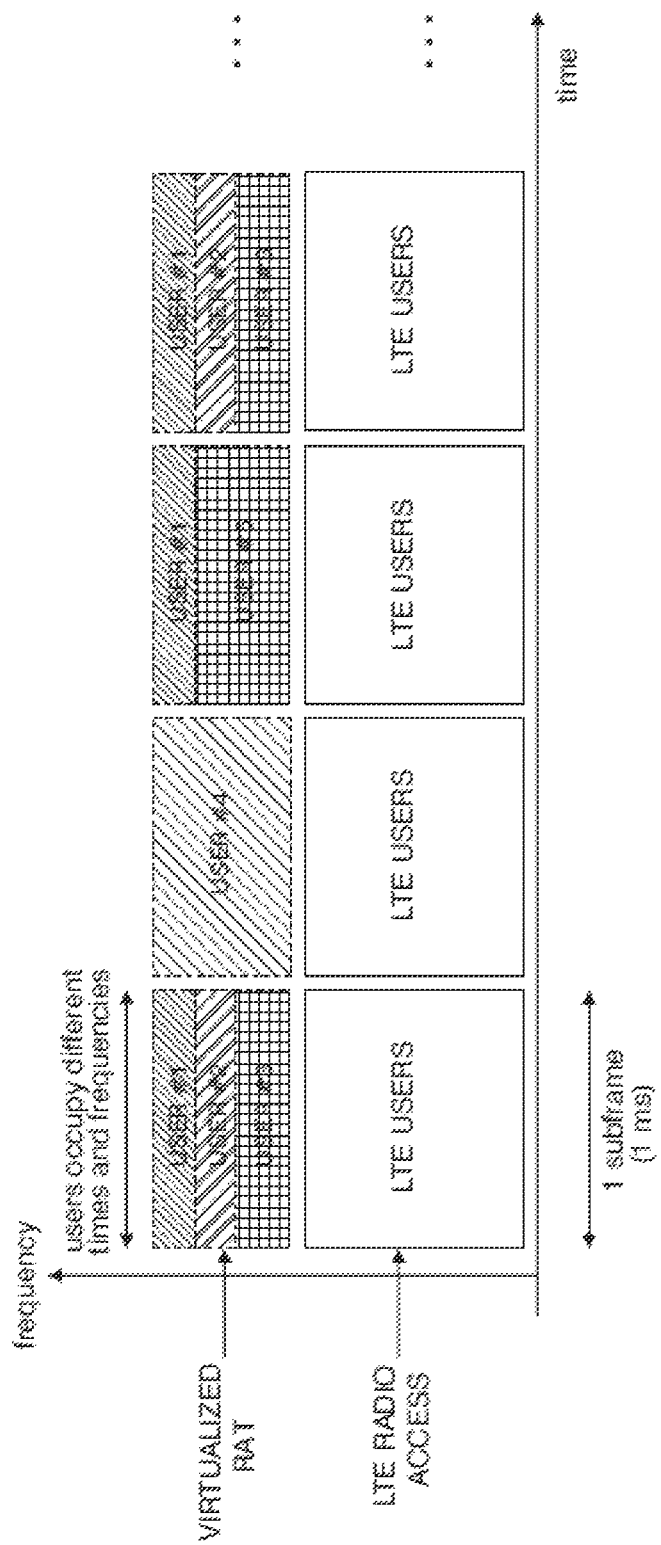
FIG. 5 is an example of a hybrid time- and frequency-division multiple access for the virtualized RAT, employing LTE as OFDMA network.

Hybrid time- and frequency-division multiple access: This case foresees a number of time occasions to be granted to users over specific frequencies in a dynamic way. The mapping operation will be performed over a number of subframes and subcarriers so as to obey the characteristic timing relationships of the virtualized RAT. FIG. 5 illustrates this case where users are granted certain subframes and subcarriers, and the mapping operation should comply with the required bandwidths and associated timings for seamless operation.

Figure 6:
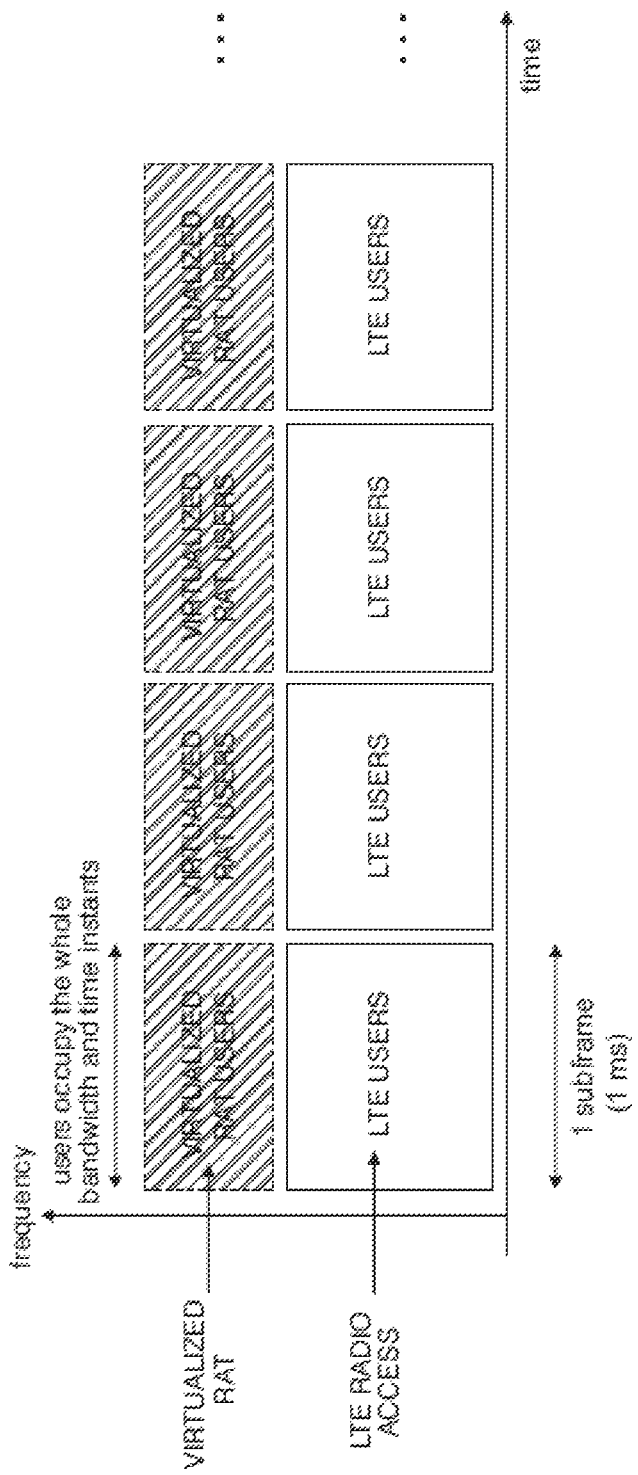
FIG. 6 is an example of a code-division multiple access for the virtualized RAT, employing LTE as OFDMA network.

Code-division multiple access: In this case the users employ the whole bandwidth and time resources, and multiplexing occurs through spreading of the complex baseband by orthogonal codes with a rate higher than the minimum needed. This is the case of CDMA or WCDMA systems such as UMTS or CDMA2000. FIG. 6 illustrates this case, where a number of users occupy the whole bandwidth for the whole time as determined by the downlink traffic, and different spreading and scrambling codes are employed for differentiation between users and signals.

Figure 7:
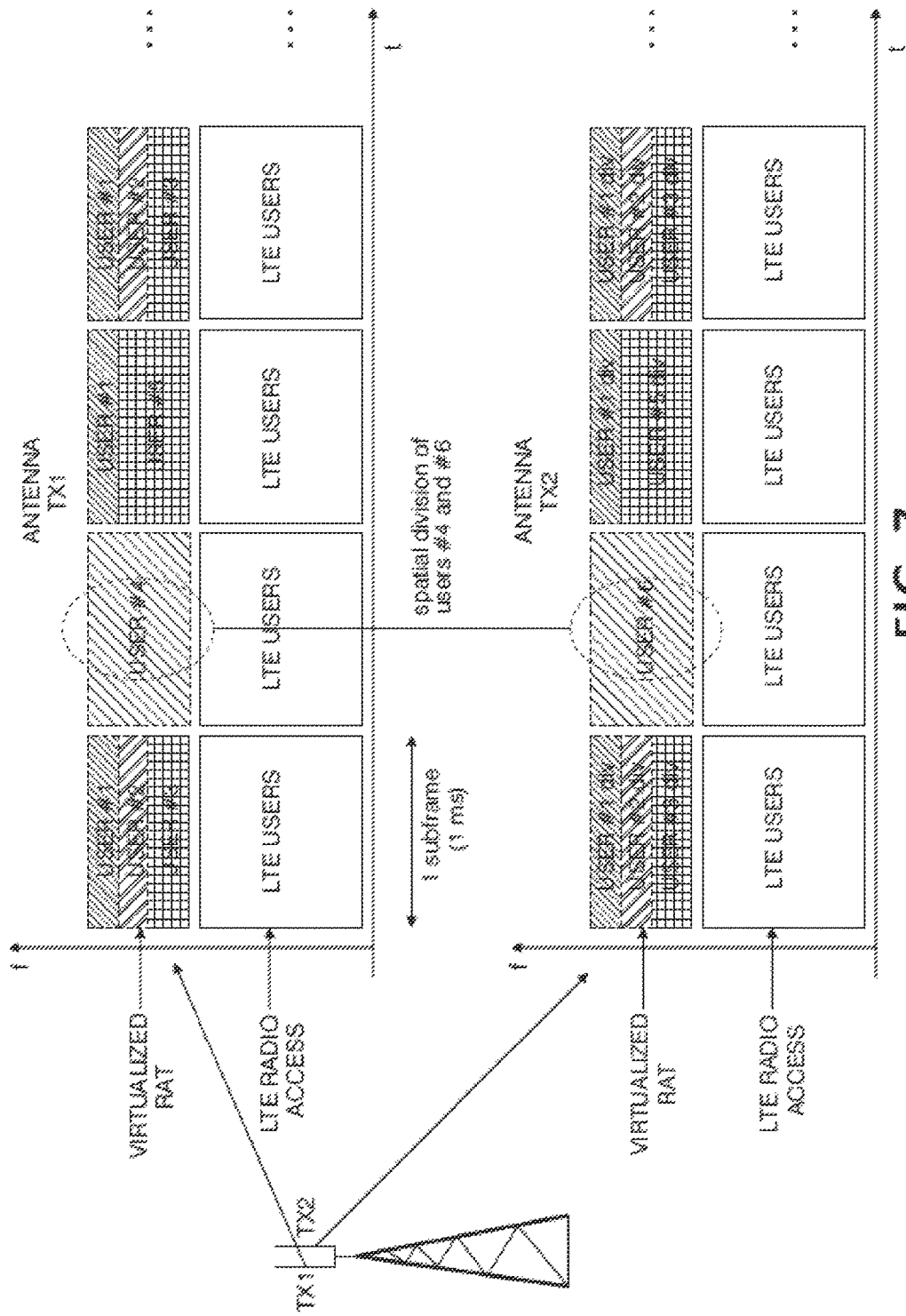
FIG. 7 is an example of a space-division multiple access for the virtualized RAT, employing LTE as OFDMA network.

Space-division multiple access: This case usually appears in combination with other multiple access schemes so as to exploit multi-antenna operation, in order to schedule multiple users in the same time/frequency resources. FIG. 7 illustrates an example of this case where spatial division is exploited for simultaneously scheduling two users (users #4 and #6) at the same resources, while for the other users a usual transmit diversity operation is performed.

All these cases can be handled through proper choice of the time-frequency resources to be reserved for each of the channels and users. Of particular relevance is the choice of the relevant pilot or training signals for channel estimation in downlink and uplink, as will be explained in the paragraphs below.

Figure 8:
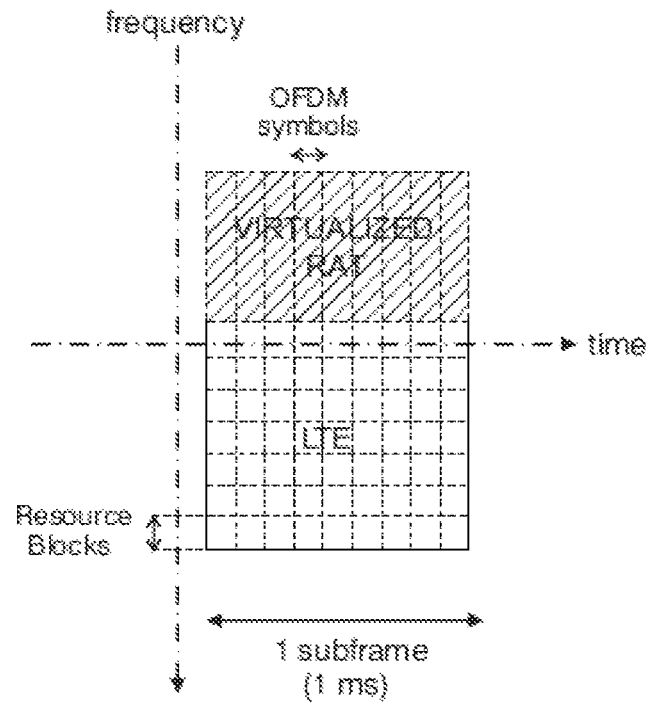
FIG. 8 illustrates the proposed splitting of the spectrum into two regions, one for LTE and the other for the virtualized RAT, employing LTE as OFDMA network.

To support virtualization of downlink radio access technologies over OFDMA characteristically, the present invention performs the following changes:

The OFDMA spectrum is split into two regions, one reserved for the virtualized RAT and the other for OFDMA, as illustrated in FIG. 8. This splitting can be semi-static according to actual cell traffic, and the amount of OFDMA spectrum reserved for RAT virtualization will be broadcast by means of suitable extensions of OFDMA system information [2]. The same splitting of the spectrum will also be used in the uplink direction.

Figure 9:
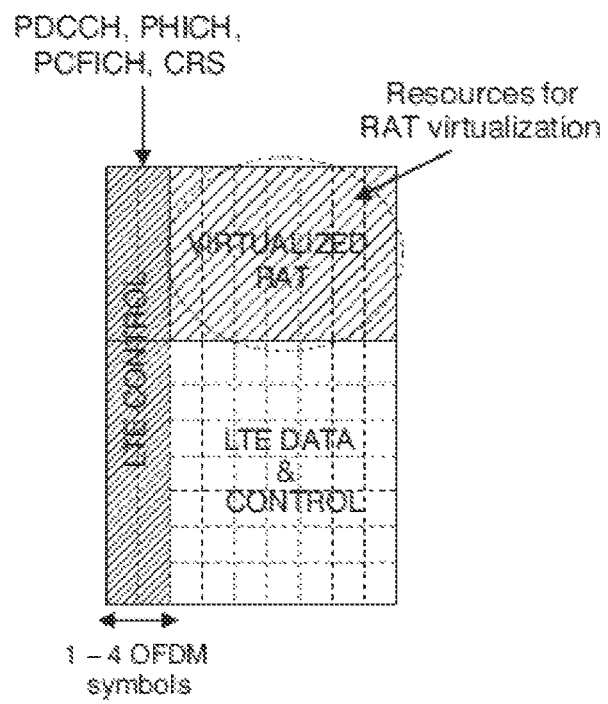
FIG. 9 illustrates an example of OFDMA control symbols which would remain unchanged at the beginning of each subframe for the case of LTE.

The time-frequency resources of the OFDMA subframe structure containing control information (such as the PDCCH, PHICH and PCFICH channels in LTE) will remain unchanged in order to support legacy OFDMA operation, as well as common control for the virtualized RAT. These symbols contain basic OFDMA scheduling information as well as cell reference signals and, if applicable, Hybrid Automatic Repeat Request (HARQ) feedback. The number of symbols devoted to control could be pre-defined (thus avoiding the need for any PCFICH channel in the case of LTE), or dynamically changed according to the information provided by an additional channel (such as the PCFICH in LTE). FIG. 9 illustrates an example of OFDMA control symbols which would remain unchanged at the beginning of each subframe for the case of LTE.

Channel estimation for the virtualized RAT will be accomplished with the aid of suitable cell reference signals (CRS), which can be based on the legacy OFDMA reference or pilot signals or a new reference signal structure. These signals will enable estimation of the channel frequency response along the spectrum reserved for the virtualized RAT at each OFDMA subframe (or part of the subframe). Any legacy training/pilot sequences devoted to channel estimation in the original RAT will then be avoided and not mapped on time-frequency resources, thus exploiting the enhanced channel detection capabilities provided by OFDMA physical layer.

Complex baseband symbols corresponding to the original RAT will be suitably mapped over the OFDMA time-frequency resources reserved for the virtualized RAT. Time division, frequency division, code division and/or space division multiple access can thus be supported within the spectrum reserved for the virtualized RAT.

Proper time/frequency synchronization will be achieved by means of OFDMA synchronization channels and signals. OFDMA System Information will also be conveyed by the foreseen channels included in the OFDMA subframes. Moreover, Timing Advance information shall be provided by the base station in order to adjust the transmission timing in uplink. All this control information will serve the purpose of managing radio resources for both OFDMA radio access and the virtualized RAT.

Devices should therefore listen to any appropriate OFDMA control information in order to maintain the physical link with the base station and at the same time perform the baseband processing required by the virtualized RAT. However, other System Information corresponding to the original RAT will also be required by the terminals, and therefore they shall also monitor the necessary control information in the control channels embedded within the virtualized RAT.

Dynamic resource allocation in the frequency domain enables flexible load distribution between RATs. Given that the OFDMA subframe duration is constant (e.g. 1 millisecond in LTE), a varying number of subcarriers results in a varying effective sampling frequency for the virtualized RAT. As an example, when applied to UMTS it is possible to extend its legacy sampling frequency ($3.84 \times 10^6$ samples per second) to any value between 0 (with no spectrum reserved for UMTS) and $30.72 \times 10^6$ samples per second (if 20 MHz spectrum of LTE spectrum is reserved for UMTS). This extends the traditional capabilities of the virtualized RAT up to any desired sampling frequency within the LTE limits, which in turn results in greater flexibility of bit rates.

The changes required on terminals and base stations comprise keeping the legacy OFDMA synchronization, initial access, channel estimation and mapping/de-mapping procedures for establishing the basic connection with the base station. The remaining aspects of the corresponding physical layers for OFDMA and the original RAT remain fundamentally unchanged. A single RF front-end is required to decode both basebands, thus benefiting from the enhanced detection properties of OFDMA and the underlying services provided by the original RAT.

Figure 10:
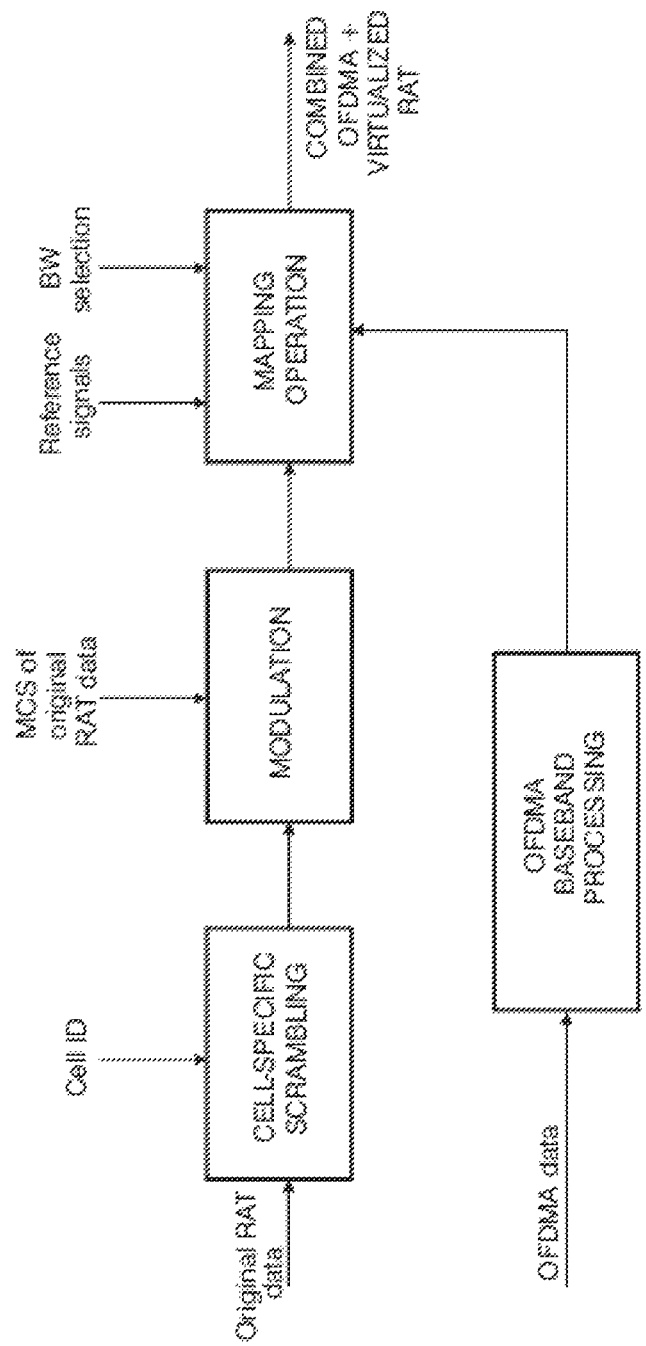
FIG. 10 illustrates the physical-layer processing for inclusion of the virtualized RAT in the downlink, according to some embodiments.

FIG. 10 illustrates the physical layer processing required by the base stations in the downlink for inclusion of the original RAT within the part of the spectrum reserved for the virtualized RAT in accordance with some embodiments. This processing adds to the general OFDMA downlink baseband processing corresponding to the OFDMA part of the spectrum.

In an embodiment, a cell-specific scrambling operation can be applied prior to mapping of complex symbols to time-frequency resources, so that transmissions from different cells appear as uncorrelated white noise after the de-scrambling operation. This will aid in the channel detection process through the proposed cell reference signals, as explained below.

The modulation and coding scheme (MCS) to be employed for each channel user will be based on the MCS foreseen by the original RAT, which in turn depends on the device capabilities and the instantaneous radio conditions. This MCS along with the granted bandwidth will determine the amount of information to be included within the OFDMA physical resources corresponding to each signal and user, including both control and data bits, as well as the size of the transport block.

The bandwidth occupied by each downlink transmission depends on the multiple access capabilities of the original RAT. For example, in GSM each user is assigned a given 200 kHz-wide carrier over a number of time slots which convey a certain amount of information, and this will be the basis for the bandwidth and time occasions to be granted within the OFDMA time-frequency structure. UMTS on the contrary does grant the whole bandwidth and time for all the signals and users; in this case the whole spectrum reserved for the virtualized RAT should be granted (with proper multiplexing of signals by using different spreading/scrambling codes).

The modulation process will convert any control/data bits into suitable constellation symbols according to the MCS format chosen by the physical layer of the original RAT.

Figure 11:
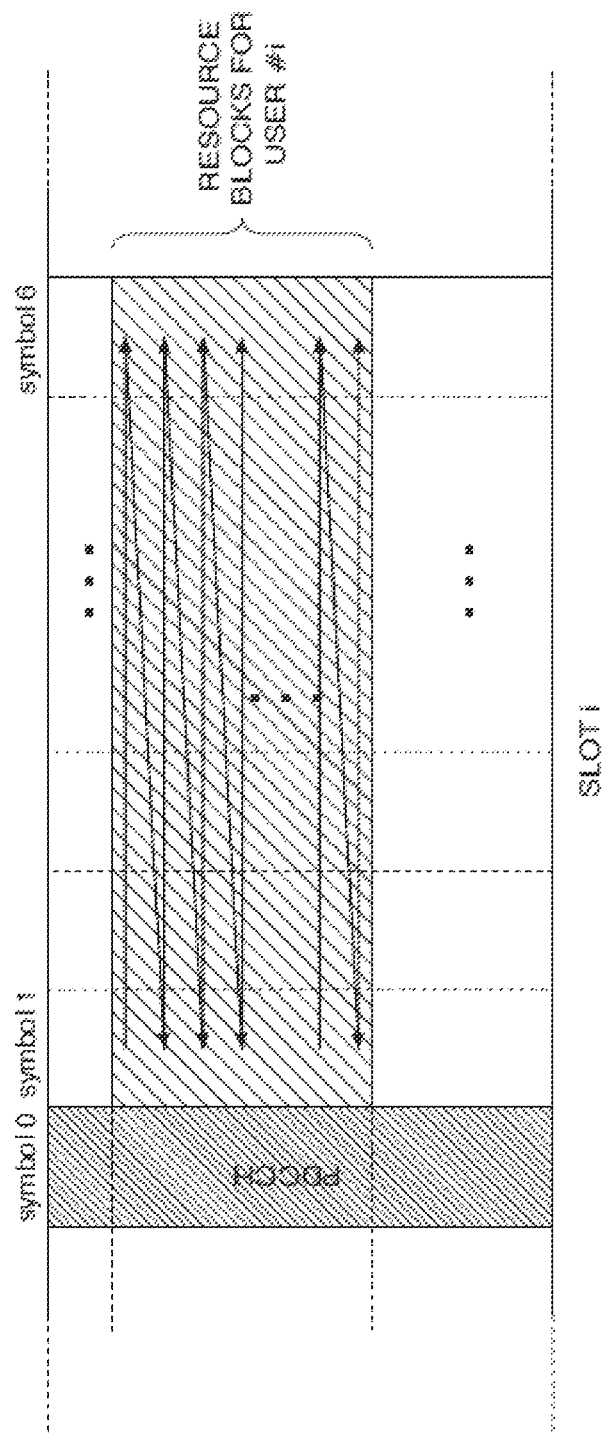
FIG. 11 is an example of mapping operation within each LTE slot, employing LTE as OFDMA wireless network.

The mapping operation will perform the logical association between complex modulated symbols into OFDMA time-frequency resources. Some of these resources will be devoted to cell reference signals and downlink control information (for instance PSS, SSS, PBCH in the case of the OFDMA wireless network being an LTE network), and the mapping operation will therefore skip them. FIG. 11 illustrates a possible mapping operation, in accordance with an embodiment, where the mapping is performed from lower to higher OFDMA symbols and from lower to higher subcarriers within each LTE slot (0.5 ms). Any other possibility is also allowed depending on implementation needs.

The UE will perform the inverse operations for detection of the information within the downlink resources reserved for the virtualized RAT.

Channel estimation in the downlink for the virtualized RAT will be performed with the aid of suitable cell reference signals spread along the spectrum reserved for the virtualized RAT. These signals can be based upon the legacy OFDMA reference signals, or else any other structure suited for the needs of the virtualized RAT can be employed.

The density of reference signals in time, frequency and space (antenna) dimensions will determine the maximum user speed, maximum channel delay spread and maximum number of antennas that will be supported by the virtualized RAT.

Figure 12:
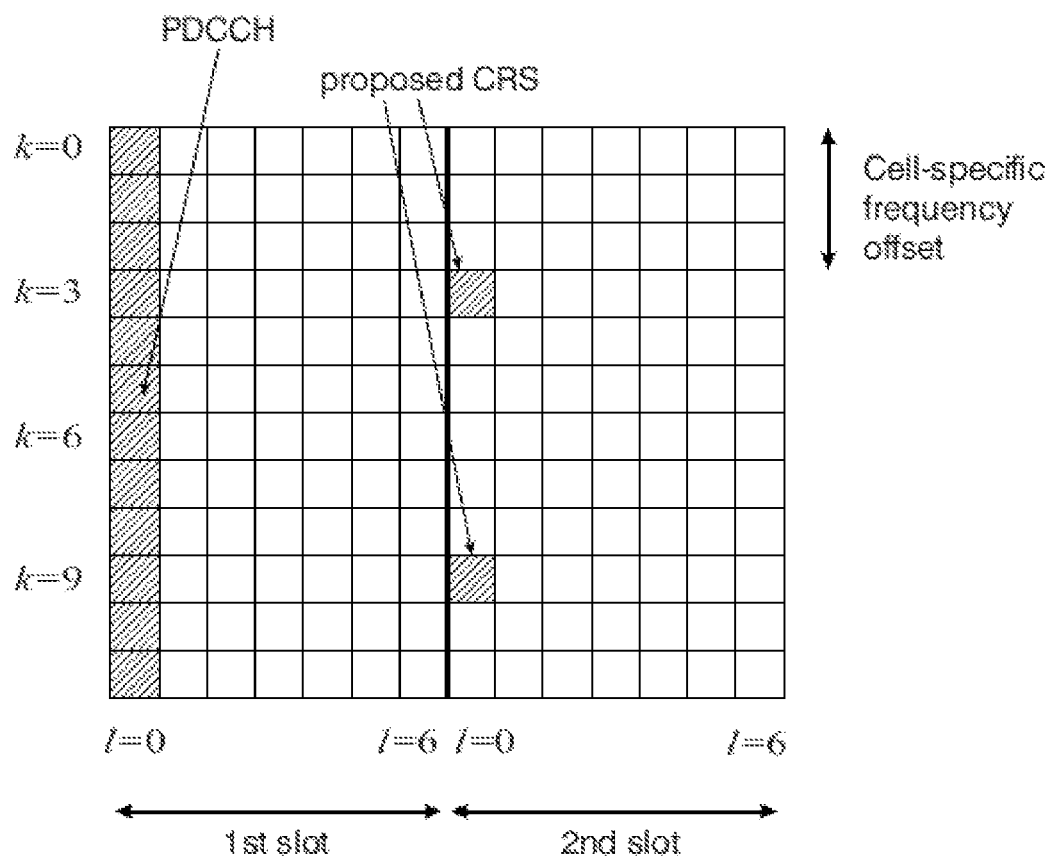
FIG. 12 is an example of reference signal structure for downlink channel estimation in the virtualized RAT, for the particular case of an LTE OFDMA network.

FIG. 12 illustrates a possible cell reference signal structure to be included in the time-frequency resources reserved for the virtualized RAT, for the particular case of LTE. Given that the first symbols containing the PDCCH will contain legacy Cell Reference Signals for standard LTE operation, only one set of additional reference signals can be foreseen in the second slot. In this case, the density of CRS signals would enable channel estimation for radio channels with coherence times equal or greater than the duration of one slot (0.5 ms), and coherence bandwidths equal or greater than 6 REs (180 kHz). This time resolution is comparable to that of UMTS, where a single pilot sequence is included per HSPA time slot (0.67 ms). Other alternatives would also be possible employing a higher or lower CRS density in the time and/or frequency dimensions according to implementation needs.

The cell reference signals corresponding to several cells will collide as in legacy LTE operation. A cell-specific frequency offset can thus be applied for avoidance of CRS collisions in adjacent cells (as illustrated in FIG. 12 with an offset of three REs), as in standard LTE operation [2]. The cell-specific scrambling code will aid in the process of discriminating the desired signals from any other interfering signals as they will transform into Gaussian-like white noise after de-scrambling.

Similarly, if multiple antennas are used the density of CRS can be increased correspondingly. The same principles can be applied in other OFDMA networks not based on LTE, without departure from the ideas proposed in this invention.

On another hand, to support virtualization of uplink radio access technologies over OFDMA characteristically, the present invention performs the following changes:

The same spectrum splitting operation foreseen in the downlink will be obeyed in the uplink, but contrary to downlink, all OFDMA symbols in the subframe will be devoted to the virtualized RAT over the spectrum reserved for it. The spectrum reserved for the virtualized RAT may be located at one of both edges for the cases where the single-carrier nature of the uplink modulation must be preserved (as in LTE), so that both OFDMA and the virtualized RAT employ contiguous spectrum regions. However other possibilities may also exist where contiguity of the spectrum is not required.

Contrary to downlink, channel estimation for the virtualized RAT will depend on the multiple access technique of the original RAT. Given that the mapping operation will translate complex symbols into time-frequency resources, the corresponding training/pilot sequences of the original RAT will have to extend over time and frequency resources in such a way that the limits for channel coherence time and channel coherence bandwidth are respectively met. Legacy OFDMA demodulation reference signals will not be used in the uplink resources of the virtualized RAT.

Complex baseband symbols corresponding to the original RAT will be mapped over OFDMA time-frequency resources. Resources corresponding to a single user will be contiguous in the frequency domain when single-carrier is required in uplink (as in LTE), or be more flexible according to each particular case.

Initial access to the cell will be performed according to OFDMA Random Access procedure. Therefore the random access channels foreseen by the original RAT will not be required. The Timing Advance shall be adjusted by terminals under control of the base station so as to ensure orthogonality in the uplink. These procedures will therefore be valid also for the virtualized RAT in the uplink, and the ones foreseen by the original RAT will not be needed.

Figure 13:
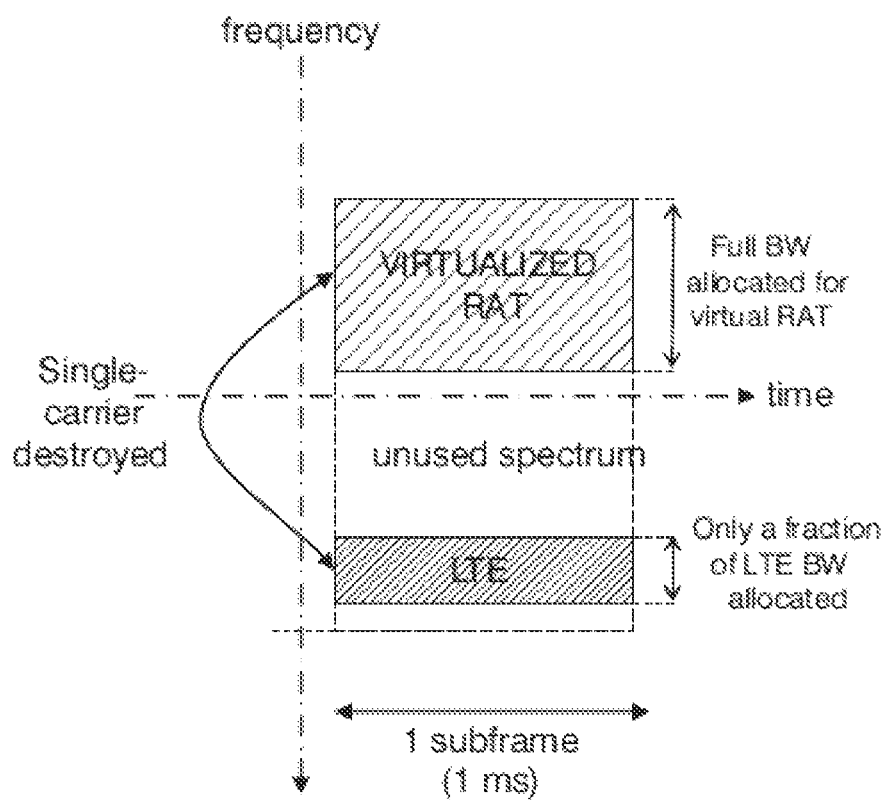
FIG. 13 illustrates a loss of the single-carrier nature in the uplink due to non-adjacent frequency assignments for LTE and the virtualized RAT.

For the case of LTE, the single carrier nature of the uplink modulation requires that the information from both LTE and the virtualized RAT is transmitted as a contiguous block in the frequency domain. This would not be an issue if simultaneous transmissions from LTE and the virtualized RAT are not required in the uplink. However, if it is required and resources are not contiguous in frequency the single carrier nature will be lost, and battery consumption will be higher due to increased Peak to Average Power Ratio (PAPR). This circumstance is illustrated in FIG. 13, where a user is simultaneously allocated full bandwidth for the virtualized RAT and only a fraction of the LTE bandwidth. The single carrier nature would be destroyed in this case and battery consumption would be higher. Sometimes this situation cannot be avoided as in WCDMA-based virtualized RATs characterized by continuous transmissions. In other multiple access schemes, it would be possible to schedule uplink subframes for LTE and the virtualized RAT at different instants in time in order to avoid the increase of PAPR.

Other standard control channels in uplink, like e.g. the Physical Uplink Control Channel (PUCCH), Demodulation Reference Signals (DMRS) or Sounding Reference Signals (SRS) in the case of LTE, will also be required for normal OFDMA uplink operation. These channels shall not extend beyond the limits of the spectrum reserved for OFDMA operation, therefore leaving the remaining frequencies for the virtualized RAT.

Figure 14:
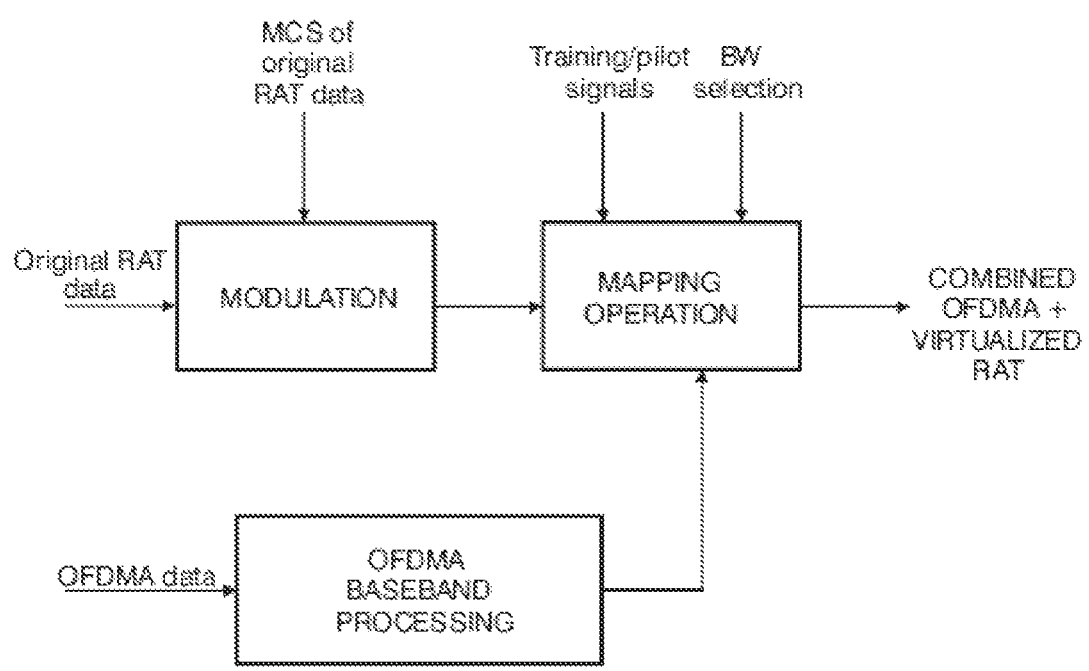
FIG. 14 illustrates the physical-layer processing for inclusion of the virtualized RAT in the uplink.

FIG. 14 illustrates the physical layer processing to be performed at the UE in the uplink, for inclusion of the virtualized RAT within the part of the spectrum reserved for that purpose.

Depending on the multiple access scheme in the original RAT, separation of the users in the uplink will be accomplished in time, frequency, code and/or space (antenna) dimensions. The MCS to be employed for the uplink will be foreseen by the original RAT according to the estimated uplink radio conditions as well as the device capabilities. The occupied bandwidth will also depend on the multiple access technique, which in turn determines the amount of information to be included within the time-frequency resources granted for each user. The modulation process will depend on the chosen MCS (or be fixed depending on the original RAT) as in the downlink case.

No specific scrambling operation is applied in this case, as user differentiation will depend on the multiple access scheme of the original RAT. The mapping operation will perform the association between complex modulated symbols into time-frequency resources as in downlink. Some of these resources will be devoted to training/pilot sequences for uplink channel estimation, as explained below.

The base station would perform the inverse operations for detection of uplink information within the resources reserved for the virtualized RAT.

Figure 15:
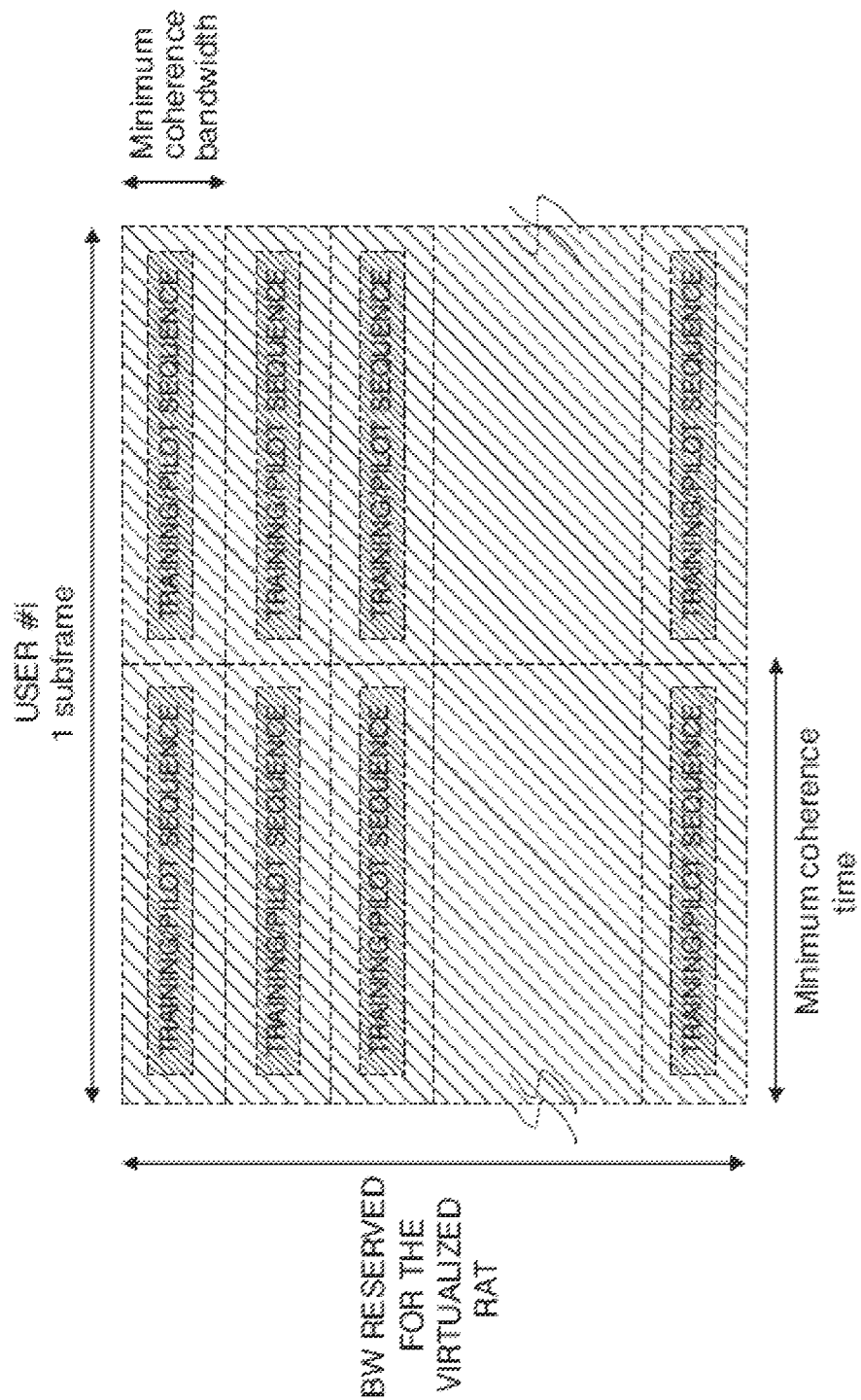
FIG. 15 illustrates the location of training/pilot sequences along time and frequency for pure time-division multiple access in the uplink.

Channel estimation in the uplink will heavily depend on the original RAT. As uplink transmissions correspond to a multiplicity of users in the cell, there cannot be a single reference signal structure to estimate all the corresponding radio channels as happens in the downlink. Moreover, depending on the multiple access scheme of the original RAT, especial care shall be taken when designing the particular training/pilot sequences to be included in the virtualized RAT:

Pure time-division multiple access: In this case the users are granted the whole bandwidth over non-overlapping time instants, and hence suitable training/pilot sequences will be inserted along the bandwidth reserved for the virtualized RAT. These sequences can be based upon those devised in the original RAT, and will enable simple channel estimation in the frequency domain along the time instants corresponding to each user. FIG. 15 schematically depicts the location of training/pilot sequences along time and frequency for pure time-division multiple access in the uplink. No interference between sequences will thus appear thanks to the time orthogonality.

The density of training/pilot sequences in the frequency domain will determine the minimum allowable coherence bandwidth of the channel, which in turn limits the maximum channel delay spread. This maximum delay spread should be aligned with the capabilities of the original RAT. Similarly there will be as many training/pilot sequences as required by the minimum channel coherence time during the whole transmission, each of the training/pilot sequences lasting for about one coherence time period. This should also be aligned with the maximum user speed as supported by the original RAT. The example in FIG. 15 shows a minimum coherence time of half a subframe (0.5 ms), but any other possibility is not precluded.

Figure 16:
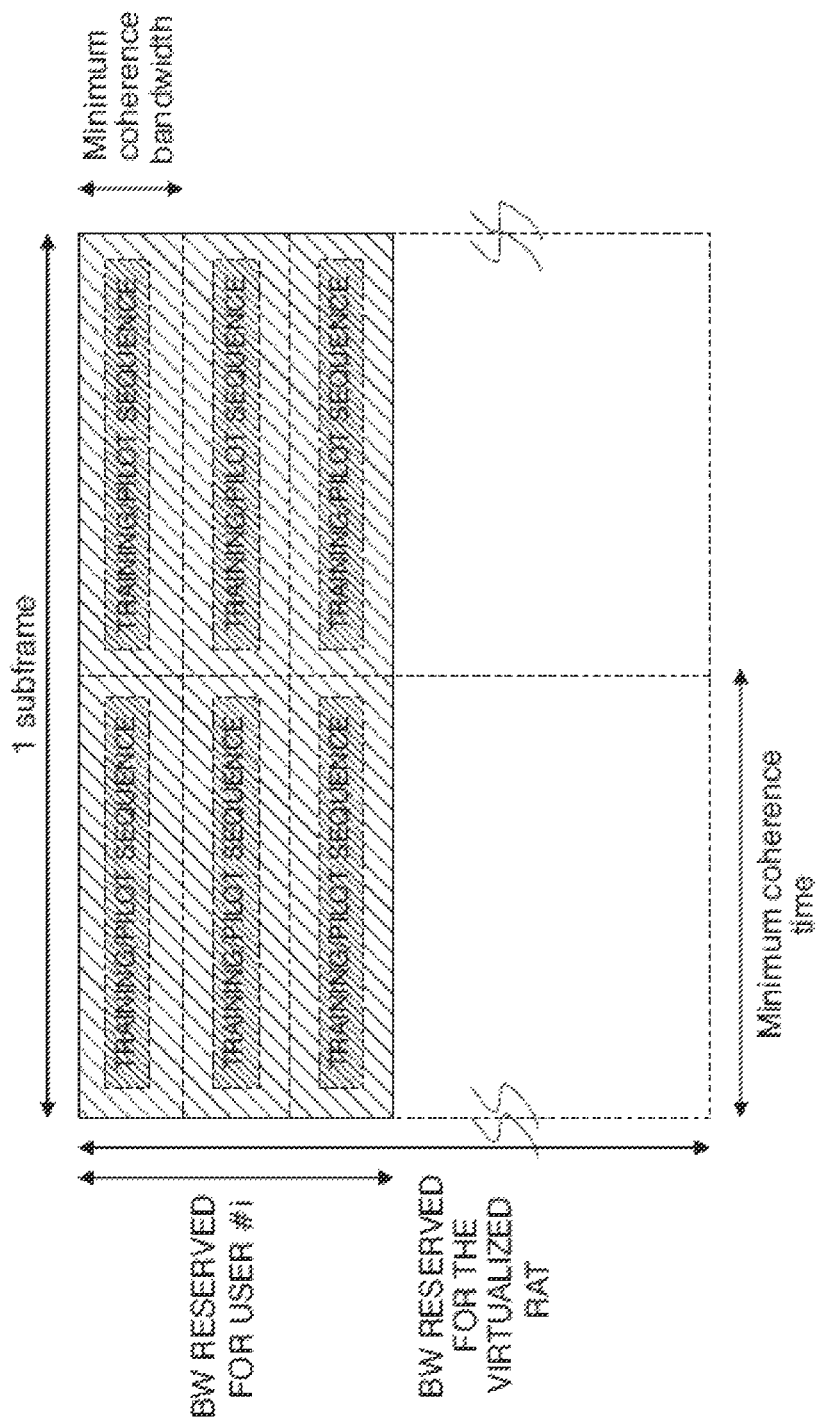
FIG. 16 illustrates the insertion of training/pilot sequences for pure-frequency division multiple access in the uplink.

Pure frequency-division multiple access: In this case users occupy non-overlapping frequency regions in the virtualized RAT, and hence suitable training/pilot sequences can be included with a time and frequency density as determined by the maximum user speed and delay spread, respectively. FIG. 16 illustrates exemplary training/pilot sequences for this case. No inter-sequence interference will appear thanks to the frequency multiplexing of resources.

Hybrid time- and frequency-division multiple access: This case is similar to the two previous cases. Suitable sequences shall be included as in FIG. 16 along the appropriate time and frequency resources for each user. There will be as many training/pilot sequences as required by the minimum coherence time and minimum coherence bandwidth of the channel.

Code-division multiple access: In this case all signals and users occupy the whole time-frequency resources and separation is realized with the aid of orthogonal or pseudo-orthogonal spreading/scrambling codes. Suitable training/pilot sequences will have to be included throughout both time and frequency dimensions.

Figure 17:
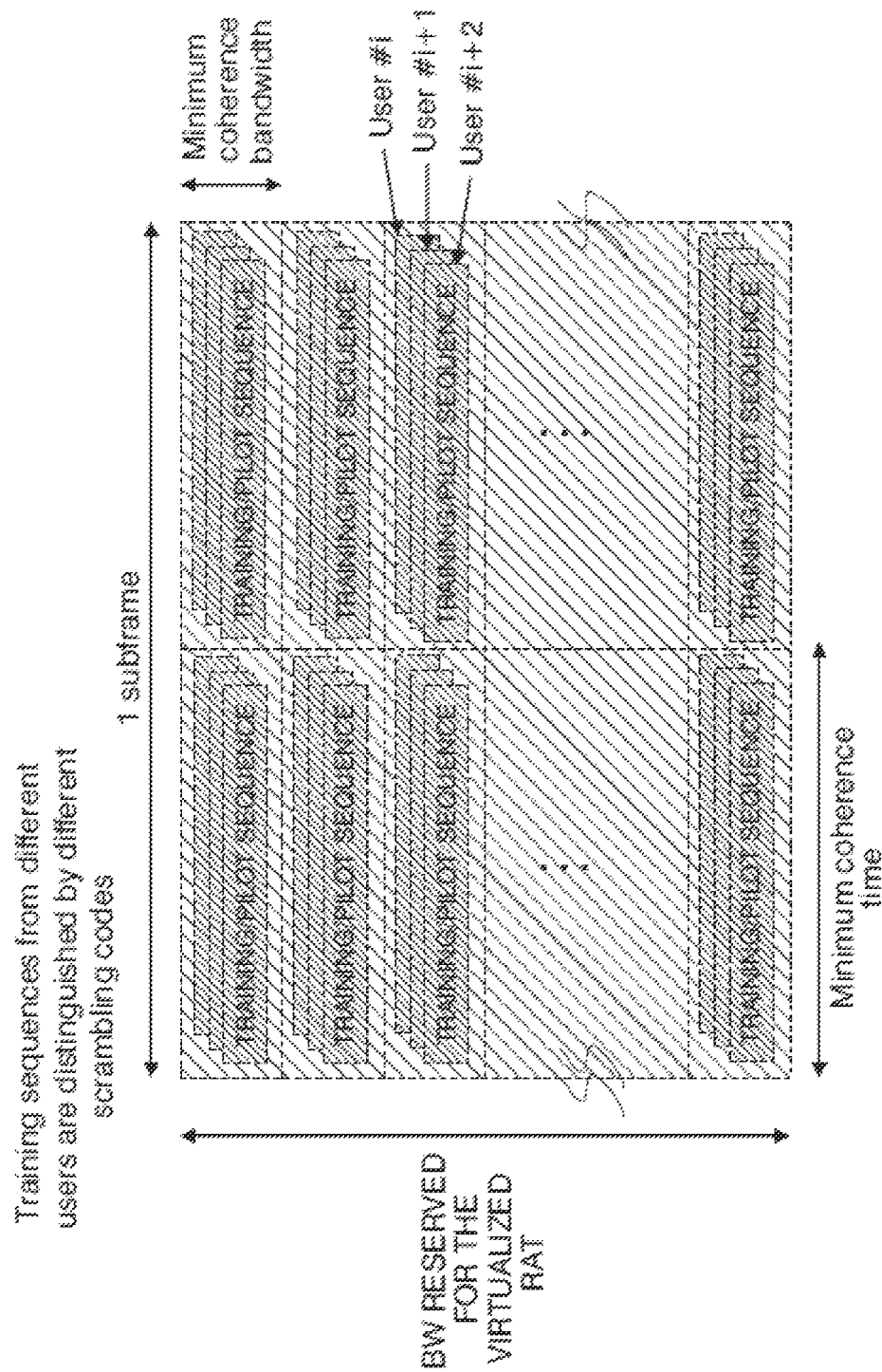
FIG. 17 illustrates the insertion of training/pilot sequences for code-division multiple access in the uplink.

FIG. 17 illustrates exemplary training/pilot sequences to be included in time-frequency resources with the aid of suitable spreading and scrambling operations. All the users will share the same spreading codes for the training/pilot sequences with a pre-defined spreading factor. User differentiation will be accomplished by application of different scrambling codes as assigned by the base station for normal uplink operation in the original RAT. The scrambling codes will serve the purpose of transforming interference from other users into additive white Gaussian noise after the de-scrambling operation, which will be rejected to some extent by the de-spreading operation prior to detecting the users.

The advantage of performing the spreading and scrambling operations in the frequency domain is that the orthogonality properties of the sequences remain unchanged irrespective of the channel characteristics. Thus no additional equalizers will be needed for removing Multiple Access Interference (MAI) which is characteristic of CDMA technologies.

Figure 18:
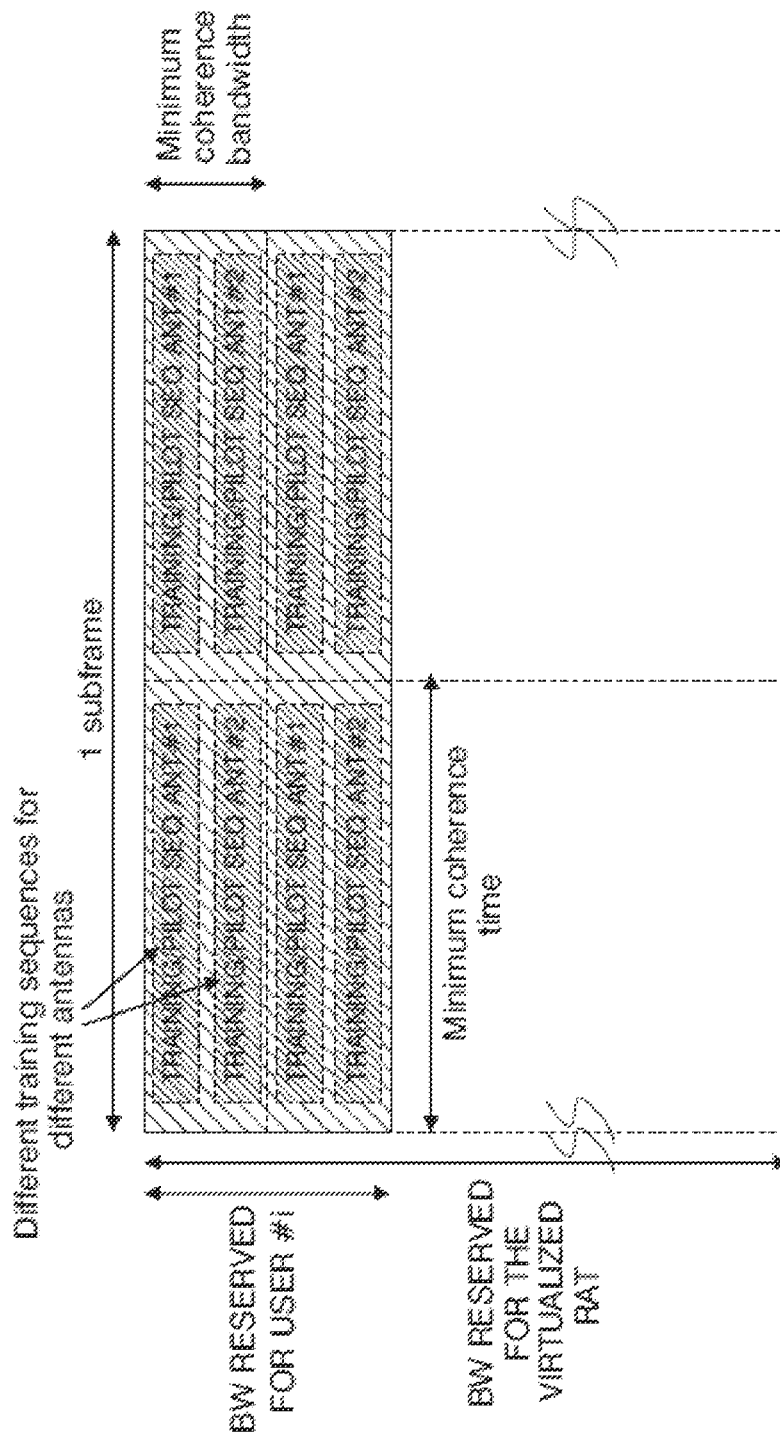
FIG. 18 illustrates the insertion of training/pilot sequences for space-division multiple access in the uplink.

Space-division multiple access: This case serves as a complement to any other multiple access type by employing multiple antennas. MIMO operation is achieved by increasing the density of training/pilot sequences as required by the additional antennas. Sequences devoted to each antenna will be independently detected by the receiver in order to obtain the different channel response components. FIG. 18 depicts an exemplary case where additional sequences are inserted for operation with two antennas in case of using frequency-division multiple access.

The most complex of the above cases corresponds to code-division multiple access. In this case multiple sequences will be necessary for channel estimation, thus adding to the overall transmit power. However WCDMA allows multiple signals in the same REs provided that the overall maximum power is not exceeded. The power of the signals mapped to REs will depend on the original RAT, and will be changed according to any devised power control strategy in order to overcome so-called near-far effect [3]. Channel detection in the frequency domain will be simpler and more effective than in conventional time-based receivers with no need to cancel intra-cell MAI. Orthogonality in the frequency domain is ensured whenever the maximum delay spread is contained within the length of the cyclic prefix.

Present invention foresees seamless operation of OFDMA and the virtualized RAT by using the same network infrastructure. Therefore the base station shall support the appropriate connections to other network elements as required by the original RAT in addition to those foreseen by the OFDMA network.

Figure 19:
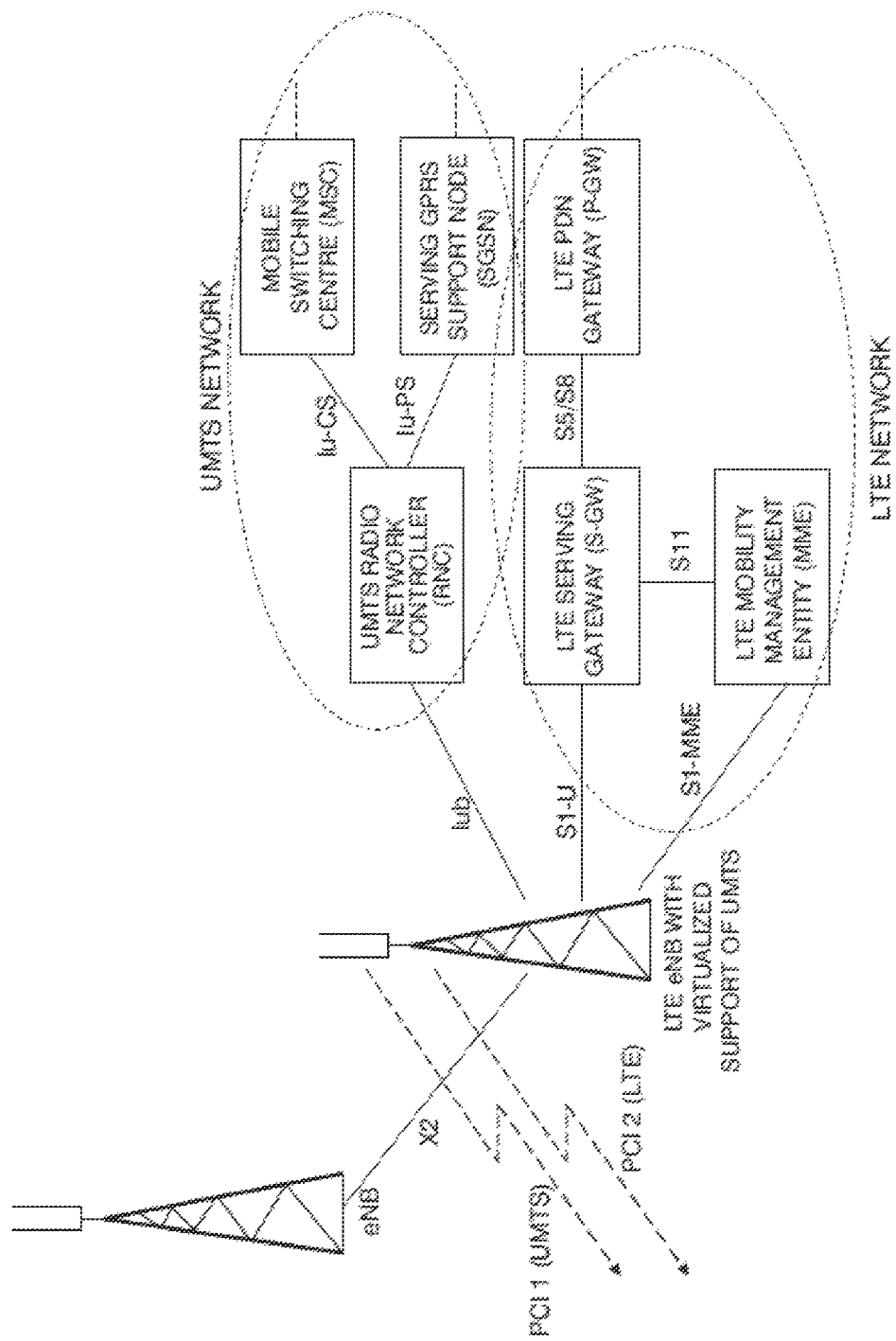
FIG. 19 illustrates the network architecture for the support of RAT virtualization over LTE, according to an embodiment.

As an example applied to LTE, FIG. 19 illustrates the connections to be supported by an LTE base station with virtualized UMTS capabilities over part of the LTE spectrum. The base station or eNodeB will have an Iub interface towards the Radio Network Controller (RNC) just as if it was a UMTS base station, in addition to the S1-U interface towards the Serving Gateway (S-GW) and the S1-MME towards the Mobility Management Entity (MME).

Given that the same base station will comprise two different radio access technologies, two different physical cell identifiers (PCI) will also be effectively broadcast to the terminals (one per RAT) through the appropriate System Information Blocks. In this way the core network elements corresponding to LTE and UMTS will not make difference between a UMTS cell and a cell with virtualized support of UMTS. Core network elements would remain unchanged as the proposed changes would be transparent for them.

Figure 20:
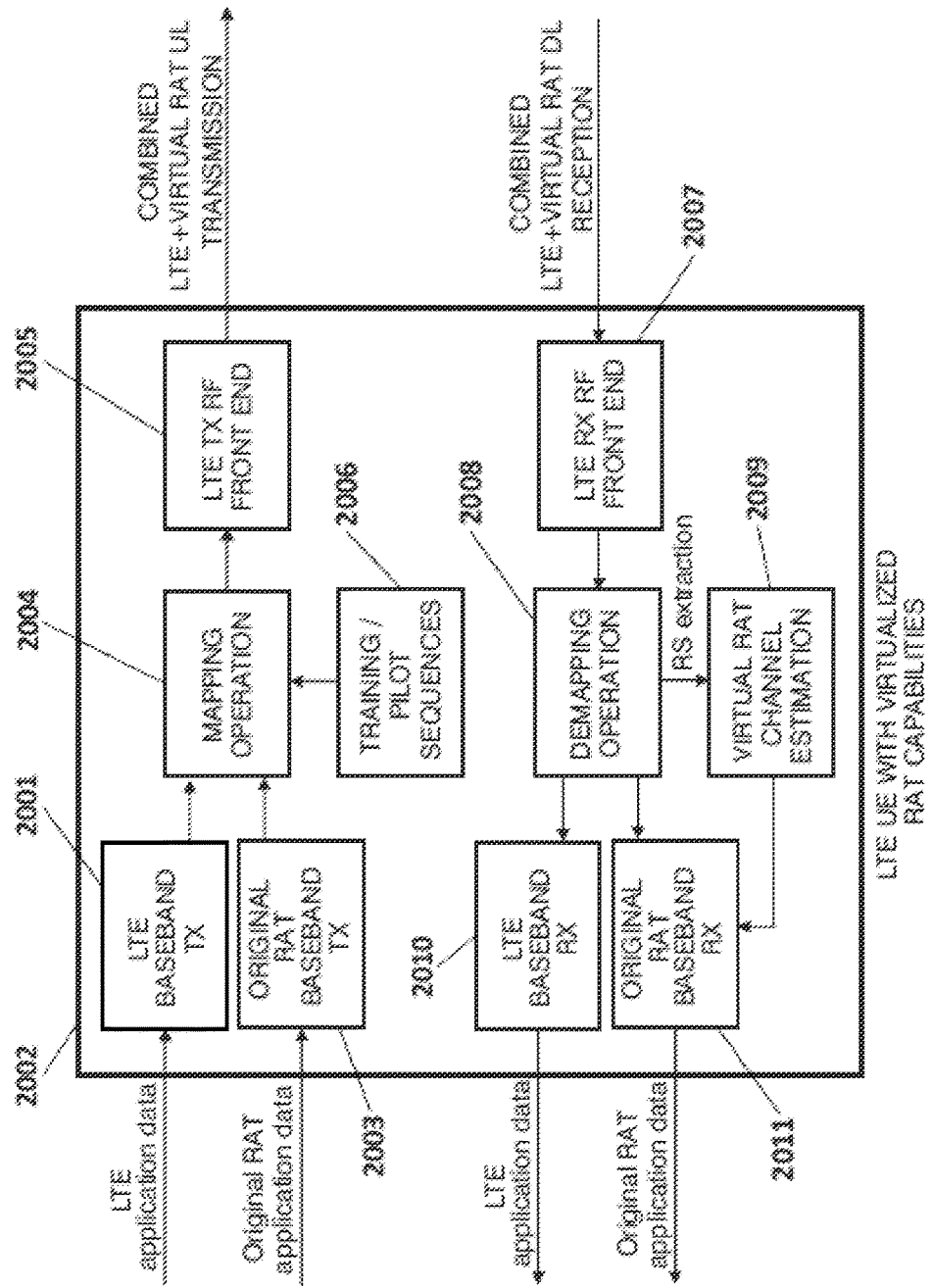
FIG. 20 is an example for the present invention in an LTE UE with baseband support of an additional RAT to be virtualized.

In reference to FIG. 20 it is illustrated an exemplary embodiment for the proposed invention in an LTE UE with baseband support of an additional RAT to be virtualized. An LTE terminal 2001 wishes to deliver data by making use of both LTE and an additional RAT over the same LTE spectrum and resources. The UE has support for both LTE baseband 2002 and the original RAT 2003 in transmission, which can be exploited by different applications. A mapping operation 2004 will combine the complex modulated baseband signals into the LTE time-frequency resources. The mapping will additionally include appropriate training/pilot sequences 2006 in specific resource elements according to the multiple access scheme employed by the original RAT. A single LTE RF front-end in transmission will translate the baseband signals into useful RF energy that will be transmitted in uplink 2005.

Upon reception, a single LTE RF front-end 2007 will convert the RF signals into complex baseband signals combining LTE and the virtualized RAT. A de-mapping operation 2008 will separate the LTE resources from those devoted to the virtualized RAT, and will also extract the reference signals included for channel estimation in the virtualized RAT. Block 2009 will perform channel estimation in the spectrum corresponding to the virtualized RAT, and blocks 2010 and 2011 will perform the necessary baseband processing for both LTE and the original RAT, respectively. Finally application data from both RATs will be delivered to the higher layers for appropriate use by the applications.

Figure 21:
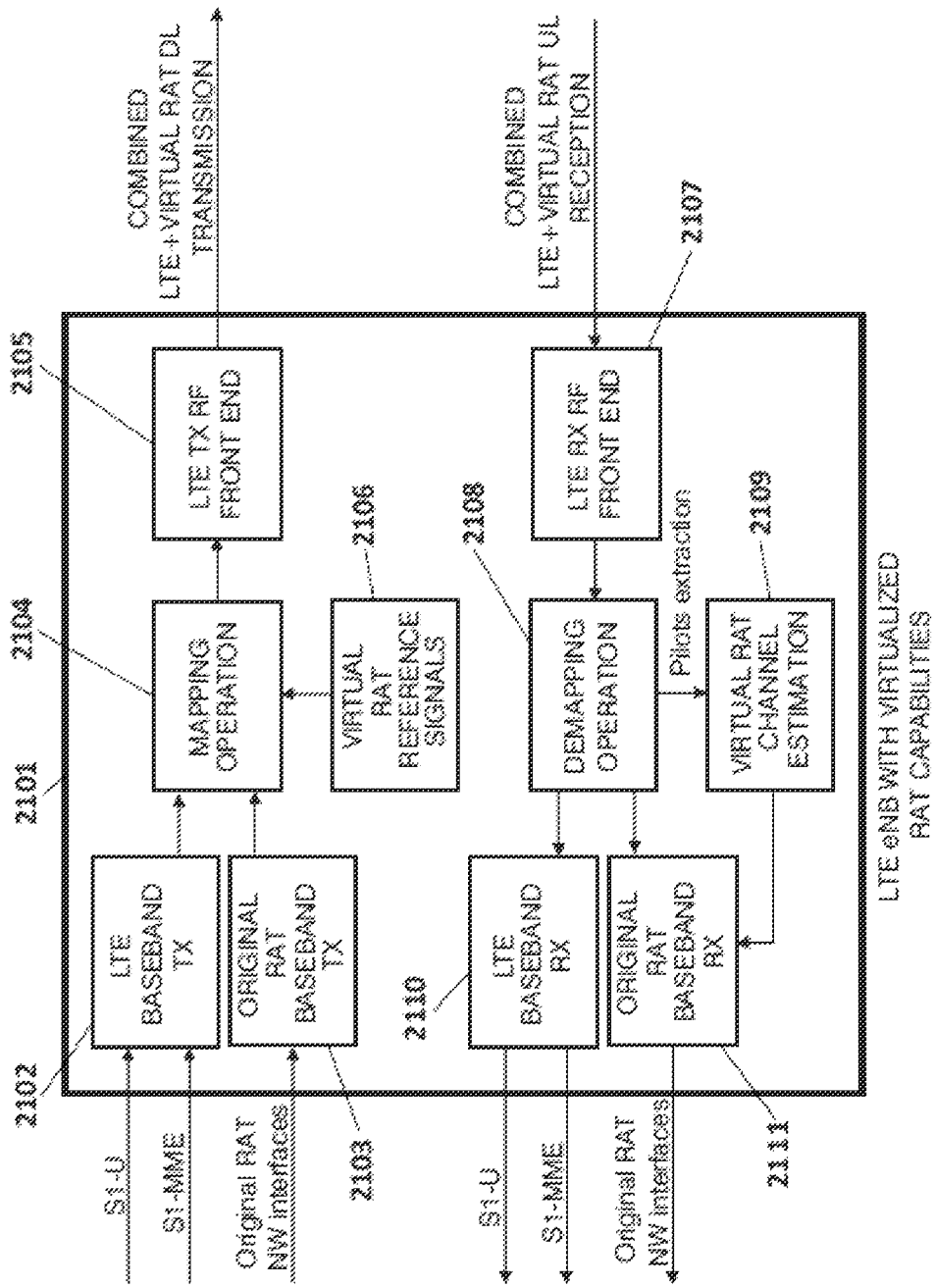
FIG. 21 is an example for the present invention in an LTE eNB with baseband support of an additional RAT to be virtualized.

FIG. 21 illustrates an exemplary embodiment for the proposed invention in an LTE eNB with baseband support of an additional RAT to be virtualized. An LTE eNB 2101 wishes to deliver data by making use of both LTE and an additional RAT over the same LTE spectrum and resources. The eNB has support for both LTE baseband 2102 and the original RAT 2103 in transmission, and the corresponding data will be received by the appropriate interfaces (S1-U and S1-MME for LTE, and the required network interfaces for the original RAT). A mapping operation 2104 will combine the complex modulated baseband signals into the LTE time-frequency resources. The mapping will additionally include appropriate reference signals 2106 for channel estimation in the virtualized RAT. A single LTE RF front-end in transmission will translate the baseband signals into useful RF energy that will be transmitted in downlink 2105.

Upon reception, an LTE RF front-end 2107 will convert the RF signals into complex baseband signals combining LTE and the virtualized RAT. A de-mapping operation 2108 will separate the LTE resources from those devoted to the virtualized RAT, and will also extract the training/pilot signals included for channel estimation in the virtualized RAT. Block 2109 will perform channel estimation in the spectrum corresponding to the virtualized RAT according to these training/pilot sequences, and blocks 2110 and 2111 will perform the necessary baseband processing for both LTE and the original RAT, respectively. Finally data will be delivered to the higher layers through S1-U and S1-MME interfaces for LTE and through the appropriate network interfaces for the original RAT.

Other similar embodiments could also be presented considering OFDMA wireless networks not based on LTE, provided that the principles described in this invention are followed. Those skilled in the art can easily perform the necessary changes for application of the proposed ideas in any OFDMA wireless network.

The provided embodiments can be implemented as a collection of software elements, hardware elements, firmware elements, or a suitable combination of them. The main advantages of the proposed invention come from the ability to support seamless inter-operation between OFDMA and other virtualized RATs by using the same spectrum and RF front-ends. Simultaneous services from different RATs can thus be provided without dual radio interfaces or complex inter-RAT handovers and reselections.

In spite of the growing interests in the latest wireless technologies (like LTE and LTE-Advanced), in many cases compatibility with legacy 2G and 3G cellular services must be ensured. This prevents operators from freeing up the corresponding spectrum bands in order to offer more advanced data services, and legacy 2G/3G base stations cannot either be switched off. The proposed invention provides means to virtualize those legacy radio access technologies within part of the OFDMA spectrum by using the same base station infrastructure, in particular the same RF front-end which is usually the most critical part. This capability allows for dynamically reserving part of the OFDMA spectrum assets to legacy RATs according to the actual traffic demand in each site. Smooth migration from legacy RATs to more advanced RATs based on OFDMA (such as LTE) can be accomplished, by dedicating part of the OFDMA spectrum to virtualization purposes while devoting a decreasing fraction of frequency resources to the virtualized RAT as the fraction of OFDMA users grows. Bulky and costly RF infrastructure at the base station (antennas, amplifiers, filters, etc.) can thus be shared among OFDMA and the virtualized RATs in a seamless way.

Additionally, devices supporting the present invention would not require separate radio frequency font-ends for each of the radio access technologies, with the resulting savings in volume and complexity. In contrast, baseband support for multiple RATs can easily be integrated with present state of the art chipsets, especially when considering 3GPP technologies where inter-RAT aspects are a key design element. A single baseband processor supporting OFDMA and the original RAT would thus be required, and a single RF chain with OFDMA capabilities could provide simultaneous services from both technologies without the need to switch between RATs in the RF front-end.

Moreover, the support of CS services by non-CS terminals is a must whenever CSFB is foreseen, as in LTE. Current CSFB capabilities in LTE require a frequency band change by the device, as well as two separate RF chains for both LTE and the other RAT. This proposal avoids the need to switch between frequencies and RATs for LTE devices to carry CS traffic. Simultaneous CS services and LTE data services would also be possible.

Virtualization of other RATs can also provide better detection capabilities than the original RAT from the enhanced detection properties of OFDMA. RATs based on WCDMA will benefit from ideal orthogonality properties, thus avoiding multiple access interference. Time- and frequency-division multiple access techniques can be seamlessly supported by OFDMA time-frequency resources and MIMO support can also be easily introduced. A mapping operation between the original baseband signals and the OFDMA resources is required, as well as suitable training/pilot sequences according to the multiple access schemes of the virtualized RAT. The design of such training/pilot sequences can surpass the capabilities of the original RAT in terms of maximum user speed and maximum supported delay spread.

The scope of the present invention is defined in the following set of claims.

The invention claimed is:

1. A method for performing virtualization of a radio access technology (RAT) over Orthogonal Frequency-Division Multiple Access (OFDMA) wireless networks, wherein at least one user terminal is wirelessly connected to at least one base station, both the at least one user terminal and the at least one base station supporting baseband processing required by the RAT in addition to baseband processing required for operation in the OFDMA wireless network, the method comprising:
  splitting OFDMA time-frequency resources into, in uplink operation, an OFDMA region comprising part of a spectrum and OFDMA symbols reserved for operation of the OFDMA wireless network, and an uplink virtualization region comprising a remaining part of the spectrum and the OFDMA symbols, the uplink virtualization region being non-overlapping with the OFDMA region and being reserved for virtualization of the RAT; and into, in downlink operation, a common control region comprising part of a spectrum and a number of OFDMA symbols reserved for common control information that is common to the OFDMA wireless network and the RAT, a data and control region comprising part of the spectrum and a number of OFDMA symbols that are not used for common control information but are reserved for data and control information of the OFDMA wireless network, and a downlink virtualization region comprising a remaining part of the spectrum and the OFDMA symbols that are reserved for virtualization of the RAT, the common control region, the data and control region, and the downlink virtualization region being non-overlapping with each other;
  reserving, in the downlink operation, resource elements of the OFDMA time-frequency resources in the downlink virtualization region, for insertion of downlink reference signals including complex sequences known by a receiver to perform downlink channel estimation by the at least one user terminal with a specified separation between signals in time and frequency domains;
  inserting, in the uplink operation, training or pilot signals along the OFDMA time-frequency resources of the uplink virtualization region by mapping the training or pilot signals over time-frequency resources scheduled for a particular user according to a multiple access scheme supported by the RAT, the mapping including reserving a number of time-frequency resources for the training or pilot signals with a specified separation between signals in the time and frequency domains; and
  mapping, in the downlink operation and the uplink operation, complex baseband symbols corresponding to information from the RAT into the OFDMA time-frequency resources of the downlink and uplink virtualization regions in the downlink operation and the uplink operation, respectively, by:
    skipping, in the uplink operation, training or pilot signals dedicated to channel estimation in the RAT; and
    skipping, in the downlink operation, OFDMA time-frequency resources reserved for insertion of downlink reference signals dedicated to channel estimation in the RAT.

2. The method of claim 1, further comprising, in the downlink operation, prior to the mapping, applying a scrambling operation to the complex baseband symbols with a cell-specific scrambling code.

3. The method of claim 1, wherein the mapping of the complex baseband symbols is performed by a time division multiple access scheme, a frequency division multiple access scheme, a code division multiple access scheme or a space division multiple access scheme according to the RAT.

4. The method of claim 1, wherein the mapping of complex baseband symbols is performed from lower to higher OFDMA symbols and from lower to higher subcarriers.

5. The method of claim 1, wherein the downlink reference signals and the uplink training or pilot signals have a separation in a time domain given by a minimum supported coherence time of a channel, and a separation in the frequency domain given by a minimum supported coherence bandwidth of the channel.

6. The method of claim 1, comprising exploiting the OFDMA time-frequency resources of the common control region by using synchronization and basic control mechanisms of the OFDMA wireless network and the RAT.

7. The method of claim 1, wherein said OFDMA wireless network is a Long Term Evolution (LTE) wireless network.

8. The method of claim 7, wherein the OFDMA time-frequency resources of the common control region include a Physical Downlink Control Channel (PDCCH), a Physical Control Format Indicator Channel (PCFICH), a Physical HARQ Indicator Channel (PHICH), a Cell Reference Signal (CRS), a Primary/Secondary Synchronization Signal (PSS/SSS) and a Physical Broadcast Channel (PBCH).

9. The method of claim 7, wherein the remaining part of the spectrum of the uplink virtualization region in the uplink operation is located at one of edges of an LTE spectrum to preserve a single-carrier nature of LTE uplink operation.

10. The method of claim 1, wherein the RAT comprises a second-generation or a third-generation cellular wireless technology including at least Global System for Mobile Communication (GSM), Universal Mobile Telecommunications Service (UMTS)/High Speed Packet Access (HSPA), Worldwide Interoperability for Microwave Access (WiMAX) or Code Division Multiple Access (CDMA) 2000.

11. The method of claim 1, further comprising translating the mapped complex baseband symbols into RF signals to be transmitted in the downlink operation or in the uplink operation.

12. A system for performing virtualization of a radio access technology (RAT) over Orthogonal Frequency-Division Multiple Access (OFDMA) wireless networks, wherein at least one user terminal is wirelessly connected to at least one base station, both the at least one user terminal and the at least one base station supporting baseband processing required by the RAT in addition to baseband processing required for operation in the OFDMA wireless network, the system comprising a memory and a processor in conjunction with the memory configured to:
  split OFDMA time-frequency resources into, in uplink operation, an OFDMA region comprising part of a spectrum and OFDMA symbols reserved for operation of the OFDMA wireless network, and an uplink virtualization region comprising a remaining part of the spectrum and the OFDMA symbols, the uplink virtualization region being non-overlapping with the OFDMA region and being reserved for virtualization of the RAT; and into, in downlink operation, a common control region comprising part of a spectrum and a number of OFDMA symbols reserved for common control information that is common to the OFDMA wireless network and the RAT, a data and control region comprising part of the spectrum and a number of OFDMA symbols that are not used for common control information but are reserved for data and control information of the OFDMA wireless network, and a downlink virtualization region comprising a remaining part of the spectrum and the OFDMA symbols that are reserved for virtualization of the RAT, the common control region, the data and control region, and the downlink virtualization region being non-overlapping with each other;
  reserve, in the downlink operation, resource elements of the OFDMA time-frequency resources in the downlink virtualization region, for insertion of downlink reference signals including complex sequences known by a receiver to perform downlink channel estimation by the at least one user terminal with a specified separation between signals in time and frequency domains;
  insert, in the uplink operation, training or pilot signals along the OFDMA time-frequency resources of the uplink virtualization region, by mapping the training or pilot signals over time-frequency resources scheduled for a particular user according to a multiple access scheme supported by the RAT, the mapping including reserving a number of time-frequency resources for the training or pilot signals with a specified separation between signals in the time and frequency domains; and
  map, in the downlink operation and the uplink operation, complex baseband symbols corresponding to information from the RAT into the OFDMA time-frequency resources of the downlink and uplink virtualization regions in the downlink operation and the uplink operation, respectively, by:
    skipping, in the uplink operation, training or pilot signals dedicated to channel estimation in the RAT; and
    skipping, in the downlink operation, OFDMA time-frequency resources reserved for insertion of downlink reference signals dedicated to channel estimation in the RAT.

13. The system of claim 12, wherein the processor is further configured to, in the downlink operation, prior to the mapping, apply a scrambling operation to the complex baseband symbols with a cell-specific scrambling code.

14. The system claim 12, wherein the downlink reference signals and the uplink training or pilot signals have a separation in a time domain given by a minimum supported coherence time of a channel, and a separation in a frequency domain given by a minimum supported coherence bandwidth of the channel.

15. The system of claim 12, wherein the processor is further configured to translate the mapped complex baseband symbols into RF signals to be transmitted in the downlink operation or in the uplink operation.

16. The system of claim 12, wherein said OFDMA wireless network is a Long Term Evolution (LTE) wireless network.

17. A computer program product for virtualization of a radio access technology (RAT) over Orthogonal Frequency-Division Multiple Access (OFMDA) wireless networks comprising a non-transitory computer-readable medium having instructions stored thereon, the instructions being executed by one or more processors for carrying out a method comprising:
  splitting OFDMA time-frequency resources into, in uplink operation, an OFDMA region comprising part of a spectrum and OFDMA symbols reserved for operation of the OFDMA wireless network, and an uplink virtualization region comprising a remaining part of the spectrum and the OFDMA symbols, the uplink virtualization region being non-overlapping with the OFDMA region and being reserved for virtualization of the RAT; and into, in downlink operation, a common control region comprising part of a spectrum and a number of OFDMA symbols reserved for common control information that is common to the OFDMA wireless network and the RAT, a data and control region comprising part of the spectrum and a number of OFDMA symbols that are not used for common control information but are reserved for data and control information of the OFDMA wireless network, and a downlink virtualization region comprising a remaining part of the spectrum and the OFDMA symbols that are reserved for virtualization of the RAT, the common control region, the data and control region, and the downlink virtualization region being non-overlapping with each other;
  reserving, in the downlink operation, resource elements of the OFDMA time-frequency resources in the downlink virtualization region, for insertion of downlink reference signals including complex sequences known by a receiver to perform downlink channel estimation by the at least one user terminal with a specified separation between signals in time and frequency domains;

inserting, in the uplink operation, training or pilot signals along the OFDMA time-frequency resources of the uplink virtualization region, by mapping the training or pilot signals over time-frequency resources scheduled for a particular user according to a multiple access scheme supported by the RAT, the mapping including reserving a number of time-frequency resources for the training or pilot signals with a specified separation between signals in the time and frequency domains; and mapping, in the downlink operation and the uplink operation, complex baseband symbols corresponding to information from the RAT into the OFDMA time-frequency resources of the downlink and uplink virtualization regions in the downlink operation and the uplink operation, respectively, by:

skipping, in the uplink operation, training or pilot signals dedicated to channel estimation in the RAT; and skipping, in the downlink operation, OFDMA time-frequency resources reserved for insertion of downlink reference signals dedicated to channel estimation in the RAT.

18. The computer program product according to claim 17, wherein the method further comprises, in the downlink operation, prior to the mapping, applying a scrambling operation to the complex baseband symbols with a cell-specific scrambling code.

* * * * *